US011577723B2

(12) United States Patent
Gautam et al.

(10) Patent No.: US 11,577,723 B2
(45) Date of Patent: Feb. 14, 2023

(54) OBJECT TRAJECTORY ASSOCIATION AND TRACKING

(71) Applicant: UATC, LLC, San Francisco, CA (US)

(72) Inventors: Shivam Gautam, Pittsburgh, PA (US); Sida Zhang, San Francisco, CA (US); Gregory P. Meyer, Pittsburgh, PA (US); Carlos Vallespi-Gonzalez, Wexford, PA (US); Brian C. Becker, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 121 days.

(21) Appl. No.: 16/938,020

(22) Filed: Jul. 24, 2020

(65) Prior Publication Data

US 2021/0402991 A1    Dec. 30, 2021

Related U.S. Application Data

(60) Provisional application No. 63/045,486, filed on Jun. 29, 2020.

(51) Int. Cl.
*B60W 30/095* (2012.01)
*G06N 3/04* (2006.01)
*B60W 40/04* (2006.01)
*G06N 3/049* (2023.01)

(52) U.S. Cl.
CPC ........ *B60W 30/0956* (2013.01); *B60W 40/04* (2013.01); *G06N 3/049* (2013.01); *B60W 2554/4042* (2020.02); *B60W 2554/4044* (2020.02)

(58) Field of Classification Search
None
See application file for complete search history.

(56) References Cited

U.S. PATENT DOCUMENTS

| 9,195,904 | B1 | 11/2015 | Liu et al. | |
|---|---|---|---|---|
| 11,126,180 | B1* | 9/2021 | Kobilarov | B60W 30/095 |
| 2020/0189573 | A1* | 6/2020 | King | B60W 30/09 |
| 2020/0225669 | A1* | 7/2020 | Silva | G01S 17/89 |
| 2020/0307563 | A1* | 10/2020 | Ghafarianzadeh | B60W 30/0956 |
| 2020/0410259 | A1* | 12/2020 | Srinivasan | G01S 17/89 |

* cited by examiner

*Primary Examiner* — Anne Marie Antonucci
*Assistant Examiner* — Kyle S Park
(74) *Attorney, Agent, or Firm* — Dority & Manning, P.A.

(57) ABSTRACT

Systems, device, and methods for trajectory association and tracking are provided. A method can include obtaining input data indicative of a respective trajectory for each of one or more first objects for a first time step and input data indicative of a respective trajectory for each of one or more second objects for a second time step subsequent to the first time step. The method can include generating, using a machine-learned model, a temporally-consistent trajectory for at least one of the one or more first objects or the one or more second objects based at least in part on the input data and determining a third predicted trajectory for the at least one of the one or more first objects or the one or more second objects for at least the second time step based at least in part on the temporally-consistent trajectory.

15 Claims, 7 Drawing Sheets

OBJECT TRAJECTORY ASSOCIATION AND TRACKING

PRIORITY CLAIM

The present application is based on and claims benefit of U.S. Provisional Application 63/045,486 having a filing date of Jun. 29, 2020, which is incorporated by reference herein.

FIELD

The present disclosure relates generally to devices, systems, and methods for object trajectory association and tracking for autonomous vehicles.

BACKGROUND

An autonomous vehicle is a vehicle that is capable of sensing its environment and navigating with minimal or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for generating a trajectory for an object. The computer-implemented method can include obtaining, by a computing system comprising one or more computing devices, input data indicative of a respective trajectory for each of one or more first objects for a first time step. The computer-implemented method can further include obtaining, by the computing system, input data indicative of a respective trajectory for each of one or more second objects for a second time step. The second time step can be subsequent to the first time step. The computer-implemented method can further include generating, by the computing system using a machine-learned model, a temporally-consistent trajectory for at least one of the one or more first objects or the one or more second objects based at least in part on the input data indicative of the respective trajectory for the one or more first objects and the input data indicative of the respective trajectory for the one or more second objects. The computer-implemented method can further include determining, by the computing system, a third predicted trajectory for the at least one of the one or more first objects or the one or more second objects for at least the second time step based at least in part on the temporally-consistent trajectory for the at least one of the one or more first objects or the one or more second objects.

Another example aspect of the present disclosure is directed to a computer-implemented training method for a machine-learned model. For one or more first training steps, the computer-implemented training method can include inputting a respective trajectory for one or more first objects for a first time step and a respective trajectory for one or more second objects for a second time step into a machine-learned model. The computer-implemented training method can include receiving, as an output of the machine-learned model, data descriptive of a first tracked trajectory for one or more of the first or second objects. The data descriptive of the first tracked trajectory can include at least one of an association of the respective trajectories for the one or more first objects to the respective trajectories for the one or more second objects and a refined trajectory for the one or more second objects. The computer-implemented training method can include determining a first loss function based at least in part on a comparison of the data descriptive of the first tracked trajectory to a ground truth tracked trajectory. The computer-implemented training method can include training the machine-learned model based at least in part on the first loss function. For one or more second training steps, the computer-implemented training method can include inputting a respective trajectory for one or more third objects for a third time step and a respective trajectory for one or more fourth objects for a fourth time step into the machine-learned model. The computer-implemented training method can include receiving, as an output of the machine-learned model, data descriptive of a second tracked trajectory for one or more of the third or fourth objects. The data descriptive of the second tracked trajectory comprising at least one of an association of the respective trajectories for the one or more third objects to the respective trajectories for the one or more fourth objects and a refined trajectory for the one or more fourth objects. The computer-implemented training method can include receiving, as an output of a first stage model, a predicted trajectory for one or more of the third objects. The computer-implemented training method can include determining a second loss function based at least in part on a comparison of the data descriptive of the second tracked trajectory to the predicted trajectory. The computer-implemented training method can include training the machine-learned model based at least in part on the second loss function.

Another example aspect of the present disclosure is directed to an autonomous vehicle. The autonomous vehicle can include one or more processors and a memory comprising one or more tangible non-transitory computer-readable media. The media can store computer-readable instructions that when executed by the one or more processors cause the one or more processors to perform operations. The operations can include obtaining input data indicative of a respective trajectory for each of one or more first objects for a first time step. The operations can further include obtaining input data indicative of a respective trajectory for each of one or more second objects for a second time step. The second time step can be subsequent to the first time step. The operations can further include generating a temporally-consistent trajectory for at least one of the one or more second objects based at least in part on the input data indicative of the respective trajectory for the one or more first objects and the input data indicative of the respective trajectory for the one or more second objects using a machine-learned model. The operations can further include determining a third predicted trajectory for the at least one of the one or more first objects or the one or more second objects for at least the second time step based at least in part on the temporally-consistent trajectory for the at least one of the one or more first objects or the one or more second objects.

Other aspects of the present disclosure are directed to various systems, apparatuses, non-transitory computer-readable media, vehicles, and computing devices.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
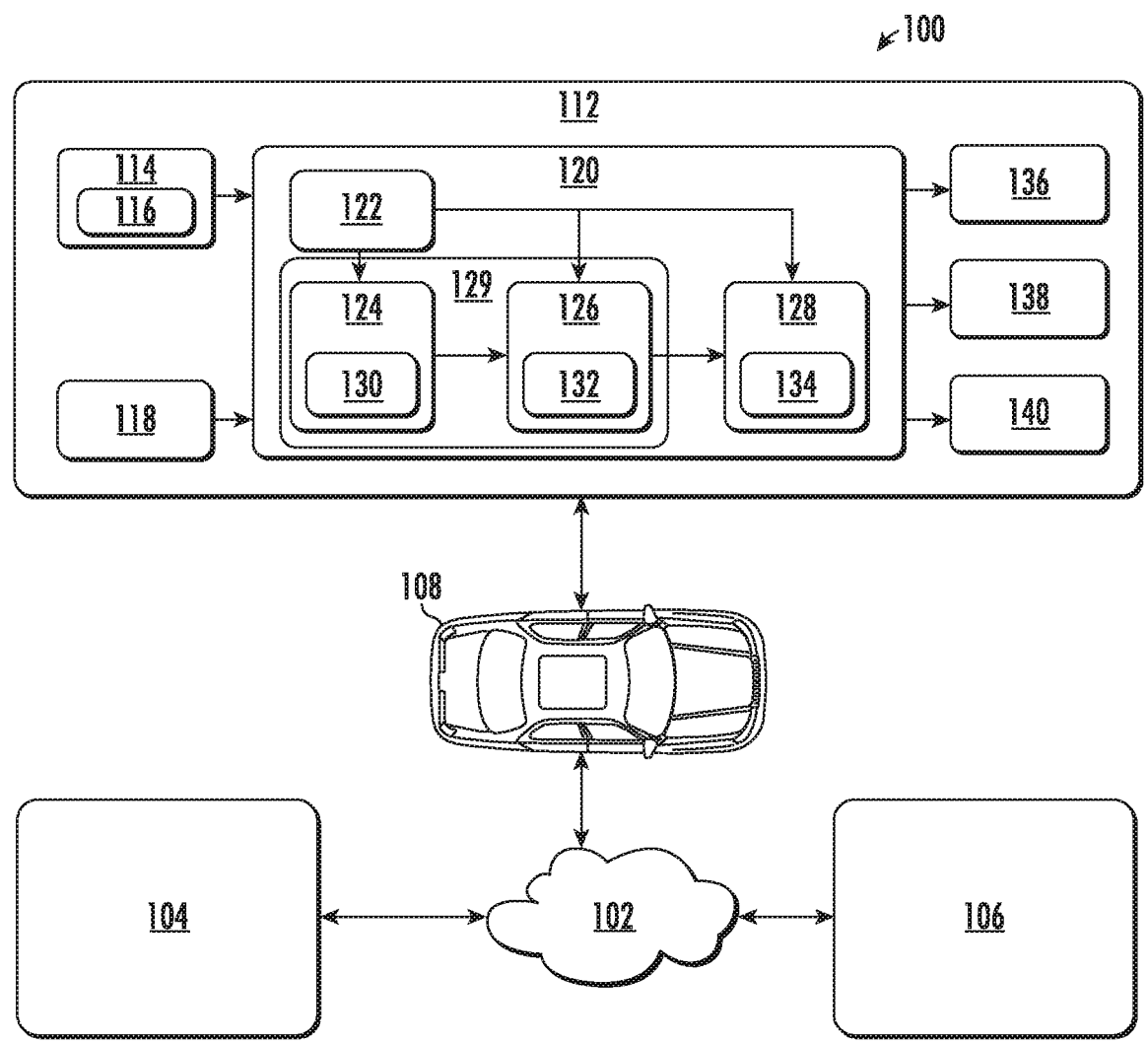
FIG. 1 depicts a diagram of an example system according to example aspects of the present disclosure.

Example aspects of the present disclosure are directed to the association and tracking of predicted trajectories for detected objects in an environment. For example, the present disclosure can be used to associate and track predicted trajectories for detected objects proximate to a vehicle, such as an autonomous vehicle. Further, the disclosed technology can more accurately associate and track predicted trajectories of objects through use of machine-learned models, which can include long short-term models (LSTM).

The disclosed technology can be implemented by a variety of computing systems that determine predicted trajectories for detected objects. In particular, the disclosed technology can be used as part of a computing system that more accurately associates predicted trajectories for detected objects at a first time step (e.g., a prior time step) to predicted trajectories for detected objects at a second time step (e.g., a current time step). Further, the computing system can concurrently refine the predicted trajectories to ensure predicted trajectories for objects are smoothed over time. In turn, this can allow for more effective control over the movement of an autonomous vehicle.

More particularly, in some implementations, an autonomous vehicle can include one or more sensors. For example, the one or more sensors of the autonomous vehicle can obtain sensor data associated with one or more objects within the surrounding environment of the autonomous vehicle. The autonomous vehicle can then analyze the sensor data to autonomously navigate through the surrounding environment. For example, in some implementations, a perception system can receive the sensor data and generate data descriptive of the one or more objects, such as data describing the position, velocity, heading, acceleration, size, type, etc. for each object. In some implementations, the perception system can provide the state data indicative of the one or more objects to a prediction system, which can determine a predicted trajectory for each object perceived by the perception system. In some implementations, the perception and prediction systems can be combined such that sensor data can be analyzed to both detect objects and determined predicted trajectories for the detected objects. For example, a first stage model can be used to generate predicted trajectories for detected objects using sensor data obtained from the sensors of an autonomous vehicle. A motion planning system can determine a motion plan for the autonomous vehicle based on the objects within the surrounding environment, the predicted future trajectories for the objects, and characteristics of the area in which the vehicle is travelling. A vehicle controller can control the motion of the autonomous vehicle based on the motion plan. In this way, an autonomous vehicle can perceive objects within a surrounding environment of the autonomous vehicle, and, in response, control the autonomous vehicle accordingly.

However, in some implementations, predicted trajectories for particular detected objects may vary at different time steps. Additionally, operating environment constraints may cause different sets of objects to be detected at different time steps. For example, during operation, an obstruction, such as another vehicle, a tree, a building, etc. may occlude a previously-detected object such that the previously-detected object is not detected at a subsequent time step. In such a situation, the previously-detected object may still be present and in motion even though the previously-detected object is not detected at the subsequent time step.

The systems and methods of the present disclosure can allow for generating temporally-consistent trajectories for detected objects using predicted trajectory data for a plurality of time steps. For example, a computing system can obtain input data indicative of a respective trajectory for each of one or more first objects for a first time step. In some implementations, the one or more first objects can be a first set of objects. In some implementations, the first time step can be a prior time step (e.g., $t=T-1$). In some implementations, the first input data can be obtained from a first stage model, such as a first stage model configured to generate predicted trajectories for detected objects using sensor data from sensors of an autonomous vehicle. In various implementations, the first input data can include: data indicative of a respective trajectory for each detected object for the first time step (e.g., $t=T-1$); object detection data (e.g., bounding box data); feature data (e.g., feature map data from the first stage model); probability data (e.g., classification probability data); state data (e.g., position, orientation, velocity, etc. data); and/or identifier data (e.g., identifier data associated with each detected object).

The computing system can also obtain second input data indicative of a respective trajectory for one or more second objects for a second time step. In some implementations, the one or more second objects can be a second set of objects, some of which may correspond to one or more of the one or more first objects. In some implementations, the second time step can be subsequent to the first time step. As an example, the second time step can be a current time step (e.g., t=T). In some implementations, the second input data can be obtained from the first stage model using sensor data obtained for the second time step. In various implementations, the second input data can include: data indicative of a respective trajectory for each detected object for the second time step (e.g., t=T); object detection data (e.g., bounding box data); feature data (e.g., feature map data from the first stage model); and/or probability data (e.g., classification probability data).

The one or more first objects and the one or more second objects may include overlapping subsets of objects. For example, a particular object in the one or more first objects may correspond to an object in the one or more second objects. However, the respective trajectories for the particular objects may not be the same, as the particular object may deviate from the first predicted trajectory at the second time step, and thus have a different predicted trajectory at the second time step. Additionally, some objects in the one or more first objects may not be present in the one or more second objects, or vice-versa.

To account for this, the first input data and the second input data can be input into a machine-learned model to generate a temporally-consistent trajectory for at least one of the one or more first objects or one or more second objects. For example, in some implementations, the machine-learned model can generate association data comprising data descriptive of an association of each respective trajectory for the one or more first objects to each respective trajectory for the one or more second objects.

In some implementations, the association data can include an association score. The association score can indicate whether a trajectory at the first time step is associated with trajectory at the second time step. In some implementations, the association score can be associated with a probability or likelihood that a trajectory at the first time step is associated with a trajectory at the second time step. For example, the association score can be positively correlated with the probability that a trajectory at the first time step is associated with a trajectory at the second time step, such that a higher score is correlated with a high probability that a trajectory at the first time step is associated with a trajectory at the second time step. By way of further example, an association score can include a numeric score ranging from zero to one-hundred in which a higher score (e.g., a score closer to one-hundred) is associated with a higher probability that a trajectory at the first time step is associated with a trajectory at the second time step. The association score can have a linear or non-linear relationship with the probability that a trajectory at the first time step is associated with a trajectory at the second time step.

In some implementations, the machine-learned model can generate the temporally-consistent trajectory for the at least one of the one or more first objects or the one or more second objects by refining the trajectory for at least one of the one or more second objects. For example, a trajectory of a particular object in the one or more second objects at the second time step may be highly associated with a trajectory of an object in the one or more first objects at the first time step. As used herein, the term "highly associated" refers to a probability that two particular objects and/or trajectories at different time steps are associated with the same entity. For example, a probability score above a threshold can indicate that a first object with a first trajectory at a first time step corresponds to a second object with a second trajectory at a second time step. The machine-learned model can refine the trajectory of the particular object in the one or more second objects at the second time step to more closely align with the associated trajectory of the one or more first objects at the first time step. As an example, the second trajectory for the particular object can be smoothed to reduce relatively large changes in velocity, direction, acceleration, etc. Further, the temporally-consistent trajectory can include a temporally-consistent position, appearance, etc.

In some implementations, generating the temporally-consistent trajectory for the at least one of the one or more first objects or the one or more second objects can include determining to birth, coast, or reap the temporally-consistent trajectory for the at least one of the one or more first objects or the one or more second objects. For example, in some implementations, if a particular object in the one or more second objects detected at the second time step does not have a trajectory highly associated with any of the one or more first objects at the first time step, the computing system (e.g., the machine-learned model) can determine that a predicted trajectory for the particular object should be birthed (e.g., created). For example, a new identifier can be associated with the particular object, which can be used at subsequent time steps. The new identifier can be added to the one or more second objects (e.g., the second set of objects) to "birth" or "create" the object.

In some implementations, generating the temporally-consistent trajectory for the at least one of the one or more first objects or the one or more second objects can include coasting a particular object in the one or more first objects. For example, a particular object (e.g. a bicyclist) in the one or more first objects can have an associated trajectory (e.g., along a sidewalk), but due to an environmental or operational constraint, such as another object occluding the particular object at the second time step, the particular object may not have an associated predicted trajectory with any of the one or more second objects. According to example aspects of the present disclosure, in such a situation, the computing system (e.g., the machine-learned model) can determine that a predicted trajectory for the particular object should be coasted (e.g., propagated forward in time). For example, the respective trajectory for the particular object at the first time step can be propagated forward to the second time step. In this way, objects which were previously detected, but not detected at subsequent time steps, can be accounted for in a motion-planning analysis.

In some implementations, generating the temporally-consistent trajectory for the at least one of the one or more first objects or the one or more second objects can include reaping a particular object in the one or more second objects. For example, if a previously-detected object (e.g., an object in the one or more first objects) does not have an associated predicted trajectory for one or more subsequent time steps (e.g., several consecutive time steps) the computing system (e.g., the machine-learned model), can reap the particular object and any associated previously predicted trajectories. For example, the particular object may have travelled beyond a threshold distance away from an autonomous vehicle such that the particular object is no longer detected and/or included in a motion planning analysis. In some implementations, the computing system can reap the particular object by removing it from the one or more second objects (e.g., removing an associated identifier from the second set of objects).

In some implementations, the computing system (e.g., the machine-learned model) can use one or more heuristics to determine whether to birth, coast, or reap an object and any associated predicted trajectories. For example, one or more thresholds can be used to make birthing, coasting, and/or reaping determinations. In some implementations, the computing system (e.g., the machine-learned model) can be trained to determine whether to birth, coast, or reap an object and any associated predicted trajectories.

The computing system can determine a predicted trajectory for the at least one of the one or more first objects or one or more second objects at the second time step (e.g., the current time step) and/or one or more third time steps (e.g., a future time step) based at least in part on the temporally-consistent trajectory for the at least one object. For example, a particular object associated with a coasted trajectory can have a predicted trajectory at a future time step which is a propagation of a previous trajectory.

The predicted trajectory for the at least one of the one or more first objects or one or more second objects can be used by the computing system to control the autonomous vehicle. For example, an autonomous vehicle can perform a motion planning analysis using the third predicted trajectory at one or more third time steps (e.g., a future time step, t=t+1, etc.) to plan a motion of the autonomous vehicle and, in response, control the motion of the autonomous vehicle.

The machine-learned model(s) of the present disclosure can include one or more convolutional layers. For example, the machine-learned model(s) can include an encoder network comprising one or more fully-connected layers into which features extracted from the input data are input into the machine-learned model. In some implementations, the machine-learned model(s) can include an LSTM which can use one or more hidden states. For example, the one or more hidden states can be updated when an association score is above a threshold that a first predicted trajectory is associated with a second predicted trajectory. Further, in some implementations, the one or more hidden states can be discarded with an association score is below a threshold. A decoder network comprising one or more fully connected layers can output data associated with the temporally-consistent trajectory (e.g., association data, refined trajectory data, etc.).

In some implementations, the machine-learned model(s) of the present disclosure can be trained using an association loss parameter and/or one or more trajectory loss parameters. For example, an association loss parameter can be a parameter descriptive of a loss between an association of a first predicted trajectory and a second predicted trajectory. For example, an association score determined by the machine-learned model(s) can be compared to a ground truth association score. The association loss parameter can be descriptive of the difference in the determined and ground truth association scores. Similarly, one or more trajectory loss parameters can be descriptive of a difference in a refined trajectory as compared to a ground truth trajectory. For example, in some implementations, a plurality of trajectory losses can be used, such as losses associated with a length, width, position, and/or orientation of a bounding box. In some implementations, the loss function used to train the machine-learned model(s) can include both an association loss parameter and a trajectory loss parameter(s). The machine-learned model(s) can be trained, for example, using backpropagation of errors.

In some implementations, the machine-learned model(s) of the present disclosure can be trained using teacher forcing training. For example, for one or more first training steps, a respective trajectory for one or more first objects for a first time step and a respective trajectory for one or more second objects for a second time step can be input into the machine-learned model. The machine-learned model can output data descriptive of an association of the respective trajectories for the one or more first objects to the respective trajectories for the one or more second objects and/or data descriptive of a refined trajectory for the one or more second objects. A first loss function can be used to train the machine-learned model(s), such as a loss function comprising an association loss parameter and/or trajectory loss parameter(s). The machine-learned model can be trained using the first loss function, such as by back propagation of errors.

The machine-learned model(s) of the present disclosure can be trained for one or more second training steps using an output of a first stage model. For example, a respective trajectory for one or more third objects for a third time step and a respective trajectory for one or more fourth objects for a fourth time step can be input into the machine learned model. An output can be received comprising data descriptive of a second tracked trajectory for the one or more third objects or one or more fourth objects. For example, the output can be descriptive of an association of trajectories and/or a refined trajectory. A first stage model can then provide an output for a predicted trajectory for one or more of the third objects. A second loss function can be determined based at least in part on a comparison of the data descriptive of the second tracked trajectory to the predicted trajectory received from the first stage model. The machine-learned model(s) can then be trained based at least in part on the second loss function, such as by back propagation of errors.

In some implementations, the loss function used to train the machine-learned model(s) of the present disclosure can include a curvature loss parameter configured to penalize second degree (or higher) polynomial coefficients of a refined trajectory. For example, a refined trajectory can be represented by a polynomial comprising one or more coefficients. The loss function can penalize the machine-learned model by comparing a second degree (or higher) coefficient to a ground truth coefficient and/or a coefficient received a first stage model.

In some implementations, the loss function used to train the machine-learned model(s) of the present disclosure can include a higher order loss configured to penalize a velocity parameter or an acceleration parameter of a refined trajectory. For example, the loss function can penalize the machine-learned model by comparing a predicted velocity or acceleration of a detected object and one or more points (e.g., waypoints) of an output refined trajectory to a ground truth acceleration and/or velocity and/or a predicted acceleration and/or velocity received from a first stage model.

The systems, methods, devices, and non-transitory computer-readable media in the disclosed technology can provide a variety of technical effects and benefits to the overall operation of a computing system and the association of predicted trajectories in particular. By more effectively associating predicted trajectories of detected objects at different time steps through use of one or more machine-learned models, the disclosed technology can provide various benefits including a reduction in trajectory tracking errors due to improper association and tracking, improved autonomous operation, reduced wear and tear on a vehicle, greater fuel efficiency, improved safety, and/or an overall improvement in the utilization of computational resources that can result from temporally-consistent trajectories for detected objects.

The example systems and methods of the present disclosure can achieve significant improvements including a reduction in the number of association and/or trajectory tracking errors. Further, the use of LSTM models, which can be configured to store trajectories of objects at past time intervals in memory, can further improve the association and tracking predicted trajectories over time. Additionally, the improvements in efficiency and performance of the disclosed technology can result in a greater efficiency of using computational resources to associate and track detected object trajectories.

Furthermore, the machine-learned model(s) of present disclosure can allow for improved birthing, coasting, and reaping of trajectories associated with detected objects over time. For example, predicted trajectories associated with previously-detected but currently occluded objects can be efficiently propagated to allow for such objects to be included in a motion planning analysis. In turn, this can allow for an autonomous vehicle to more readily account for such objects, thereby allowing for an autonomous vehicle to determine improved, safer, and more efficient motion plans.

The machine-learned model(s) of the present disclosure can additionally allow for more efficient training processes to be used. For example, a variety of loss parameters can be used to train the machine-learned model(s), such as association losses, refined trajectory losses, higher order losses, and/or curvature losses. Further, in some implementations, the machine-learned model(s) can be trained to make birthing, coasting, and reaping decisions, thereby eliminating the need for heuristic rules-based system that may require burdensome, manual re-writing of a set of rules. Additionally, the machine-learned models of the present disclosure can easily be revised as new training data is made available. As such, use of machine-learned models trained on training data including ground-truth trajectories as well as first stage model predicted trajectories can provide a scalable and customizable solution.

The disclosed technology can also improve the operation of a vehicle by reducing the amount of wear and tear on vehicle components through earlier and more accurate trajectory tracking. For example, more accurate trajectory association can result in more gradual adjustments in the vehicle's travel path that can be performed based on the more accurate trajectory association for objects in the environment surrounding the vehicle. By way of further example, more efficient trajectory association can result in more lead time for an autonomous vehicle's navigation system, resulting in a smoother and safer ride with a reduction in the number of sudden stops that impose strain on a vehicle's engine, braking, and steering systems. Additionally, faster and more accurate trajectory association can improve the comfort of a passenger when the vehicle is in transit due to smoother adjustments by the vehicle that result from more accurate motion flow estimation.

Additionally, more effective trajectory association can allow for an improvement in safety for passengers inside a vehicle as well as for those outside of the vehicle, such as pedestrians, cyclists, and/or passengers of other vehicles. For example, by more accurately and efficiently associating trajectories of detected objects over time, the systems and methods of the present disclosure can allow for more accurate and efficient operation of an autonomous vehicle's motion planning system which can be used to more create motion paths for the autonomous vehicle and avoid unintentional contact with objects outside the vehicle. Furthermore, the improvements in trajectory tracking can result in a reduction in fuel and/or energy usage by the autonomous vehicle.

Accordingly, the more effective trajectory association of the present disclosure allows for a host of improvements including: a reduction in tracking errors due to incorrect trajectory association; improved customizability and scalability; reduced wear and tear on a vehicle; greater fuel efficiency; improved safety; and/or an overall improvement in the utilization of computational resources.

With reference now the FIGS., FIG. 1 depicts a diagram of an example system 100 according to example aspects of the present disclosure. As illustrated, FIG. 1 shows a system 100 that includes a communications network 102; an operations computing system 104; one or more remote computing devices 106; a vehicle 108; a vehicle computing system 112; one or more sensors 114; sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider that can provide one or more services to a plurality of users via a fleet of vehicles that can include, for example, the vehicle 108. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 108. The one or more computing devices of the operations computing system 104 can include one or more processors and one or more memory devices. The one or more memory devices of the operations computing system 104 can store instructions that when executed by the one or more processors cause the one or more processors to perform one or more operations and/or functions including any of the operations and/or functions that can be performed by the one or more remote computing devices 106 and/or the vehicle computing system 112. Furthermore, the operations computing system 104 can perform one or more operations and/or functions including accessing input data (e.g., perception data 124, prediction data 126, etc.) and/or sensor data 116 that can include information associated with one or more detected objects for one or more time steps (e.g., time intervals), such as predicted trajectory data for an object, bounding box data, probability data, feature map data, identifier data (e.g., track ID's), state data, etc.; generating association data based on the input data and/or sensor data 116 and one or more machine-learned models; generating refined trajectory data based on the input data and/or sensor data 116 and one or more machine-learned models; determining a temporally-consistent trajectory for one or more objects based at least in part on the association data and/or the refined trajectory data; determining a predicted trajectory for one or more time steps; and outputting the predicted trajectory data for the one or more detected objects.

In some implementations, the one or more operations and/or functions performed by the operations computing system 104 can include controlling the operation of a device (e.g., an autonomous vehicle) based at least in part on the association data and/or the object classification probability distribution.

Furthermore, the one or more memory devices of the operations computing system 104 can store data including instructions used to implement one or more machine-learned models that have been configured and/or trained to generate an output based at least in part on an input provided to the one or more machine-learned models. For example, the one or more machine-learned models stored in the one or more memory devices of the operations computing system 104 can include one or more convolutional neural networks, one or more residual convolutional neural networks, one or more recurrent neural networks, one or more Long Short Term Memory (LSTM) networks, and/or one or more recursive neural networks. Further, the one or more machine-learned models stored in the one or more memory devices of the operations computing system 104 can include one or more machine-learned models that are described herein.

Furthermore, the operations computing system 104 can be configured to monitor and communicate with the vehicle 108 and/or its users to coordinate a vehicle service provided by the vehicle 108. To do so, the operations computing system 104 can manage a database that includes data including object data associated with one or more detected objects (e.g., objects external to the vehicle 108) and/or vehicle data. The object data can include a location of an object (e.g., a latitude, longitude, and/or altitude of an object detected by the one or more sensors 114 of the vehicle 108), state data associated with of objects external to a vehicle (e.g., the physical dimensions, velocity, acceleration, heading, location, shape, and/or appearance of objects external to the vehicle). The vehicle data can include the state of a vehicle (e.g., the velocity, acceleration, heading, and/or location of the vehicle 108).

The operations computing system 104 can communicate with the one or more remote computing devices 106 and/or the vehicle 108 via one or more communications networks including the communications network 102. The communications network 102 can send and/or receive signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 102 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 108.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 108 including sending and/or receiving data or signals to and from the vehicle 108, monitoring the state of the vehicle 108, and/or controlling the vehicle 108. Furthermore, the one or more memory devices of the one or more remote computing devices 106 can be used to store data including the input data, the sensor data, the training data, and/or the one or more machine-learned models that are stored in the operations computing system 104.

The one or more remote computing devices 106 can communicate (e.g., exchange data and/or signals) with one or more devices including the operations computing system 104 and the vehicle 108 via the communications network 102. For example, the one or more remote computing devices 106 can request the location of the vehicle 108 or the state of one or more objects detected by the one or more sensors 114 of the vehicle 108, via the communications network 102.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 108 including a location (e.g., a latitude and longitude), a velocity, acceleration, a trajectory, and/or a path of the vehicle 108 based in part on signals or data exchanged with the vehicle 108. In some implementations, the operations computing system 104 can include the one or more remote computing devices 106.

The vehicle 108 can be a: ground-based vehicle which can include an automobile, a motorcycle, a truck, a bus, a train, a tram, a tracked vehicle, a light electric vehicle, a moped, a scooter, and/or an electric bicycle; an aircraft which can include an airplane, a drone aircraft, a vertical take-off and landing (VTOL) craft, and/or helicopter; a boat; a submersible vehicle which can include a submarine; an amphibious vehicle; a hovercraft; a robotic device including a bipedal, wheeled, or quadrupedal robotic device; and/or any other type of vehicle. The vehicle 108 can be an autonomous vehicle that can perform various actions including driving, navigating, and/or operating, with minimal and/or no interaction from a human driver. The vehicle 108 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 108 can provide driving and navigational operation with minimal and/or no interaction from a human driver present in the vehicle. A semi-autonomous operational mode can be one in which the vehicle 108 can operate with some interaction from a human driver present in the vehicle. Park and/or sleep modes can be used between operational modes while the vehicle 108 performs various actions including waiting to provide a subsequent vehicle service, and/or recharging between operational modes.

An indication, record, and/or other data indicative of the state of the vehicle 108, the state of one or more passengers of the vehicle 108, and/or the state of an environment external to the vehicle 108 including one or more objects (e.g., the physical dimensions, velocity, acceleration, heading, location, and/or appearance of the one or more objects) can be stored locally in one or more memory devices of the vehicle 108. Furthermore, the vehicle 108 can provide data indicative of the state of the one or more objects (e.g., physical dimensions, velocity, acceleration, heading, location, and/or appearance of the one or more objects) within a predefined distance of the vehicle 108 to the operations computing system 104, which can store an indication, record, and/or other data indicative of the state of the one or more objects within a predefined distance of the vehicle 108 in one or more memory devices associated with the operations computing system 104 (e.g., remote from the vehicle).

The vehicle 108 can include and/or be associated with the vehicle computing system 112. The vehicle computing system 112 can include one or more computing devices located onboard the vehicle 108. For example, the one or more computing devices of the vehicle computing system 112 can be located on and/or within the vehicle 108. The one or more computing devices of the vehicle computing system 112 can include various components for performing various operations and functions including any of the one or more operations and/or functions that can be performed by the operations computing system 104 and/or the one or more remote computing devices 106. Further, the one or more computing devices of the vehicle computing system 112 can include one or more processors and one or more tangible non-transitory, computer readable media (e.g., memory devices). The one or more tangible non-transitory, computer readable media can store instructions that when executed by the one or more processors cause the vehicle 108 (e.g., its computing system, one or more processors, and other devices in the vehicle 108) to perform operations and/or functions, including any of the operations and/or functions that can be performed by any of the operations computing system 104, and/or the one or more remote computing devices 106. Furthermore, the one or more memory devices of the vehicle computing system 112 can be used to store data including the input data, the sensor data, the training data, and/or the one or more machine-learned models that are stored in the operations computing system 104.

Furthermore, the vehicle computing system 112 can perform one or more operations associated with the control, exchange of data, and/or operation of various devices and systems including autonomous devices, robotic devices, augmented reality devices, and/or other computing devices.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including input data and/or sensor data 116 associated with one or more objects that are proximate to the vehicle 108 (e.g., within range or a field of view of one or more of the one or more sensors 114). The one or more sensors 114 can include one or more LiDAR systems, one or more radar systems, one or more cameras (e.g., visible spectrum cameras and/or infrared cameras), one or more sonar systems, one or more motion sensors, and/or other types of image capture devices and/or sensors. The sensor data 116 can include image data, radar data, LiDAR data, sonar data, and/or other data acquired by the one or more sensors 114. The one or more objects can include, for example, pedestrians, cyclists, vehicles, bicycles, buildings, roads, sidewalks, foliage, utility structures, bodies of water, and/or other objects. The one or more objects can be located on or around (e.g., in the area surrounding the vehicle 108) various parts of the vehicle 108 including a front side, rear side, left side, right side, top, or bottom of the vehicle 108. The sensor data 116 can be indicative of locations associated with the one or more objects within the surrounding environment of the vehicle 108 at one or more times. For example, sensor data 116 can be indicative of one or more LiDAR point clouds associated with the one or more objects within the surrounding environment. The one or more sensors 114 can provide the sensor data 116 to the autonomy computing system 120.

In addition to the sensor data 116, the autonomy computing system 120 can retrieve or otherwise obtain data including the map data 122. The map data 122 can provide detailed information about the surrounding environment of the vehicle 108. For example, the map data 122 can provide information regarding: the identity and/or location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 108. The positioning system 118 can be any device or circuitry for analyzing the position of the vehicle 108. For example, the positioning system 118 can determine a position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 108 can be used by various systems of the vehicle computing system 112 and/or provided to one or more remote computing devices (e.g., the operations computing system 104 and/or the remote computing device 106). For example, the map data 122 can provide the vehicle 108 relative positions of the surrounding environment of the vehicle 108. The vehicle 108 can identify its position within the surrounding environment (e.g., across six axes) based at least in part on the data described herein. For example, the vehicle 108 can process the sensor data 116 (e.g., LiDAR data, camera data) to match it to a map of the surrounding environment to get a determination of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 108 and determine a motion plan for controlling the motion of the vehicle 108 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment, including for example, a motion plan navigates the vehicle 108 around the current and/or predicted locations of one or more objects detected by the one or more sensors 114. The autonomy computing system 120 can control the one or more vehicle control systems 138 to operate the vehicle 108 according to the motion plan.

The autonomy computing system 120 can identify one or more objects that are proximate to the vehicle 108 based at least in part on the sensor data 116 and/or the map data 122. For example, the perception system 124 can obtain state data 130 descriptive of a current and/or past state of an object that is proximate to the vehicle 108. The state data 130 for each object can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class), and/or other state information. The perception system 124 can provide the state data 130 to the prediction system 126 (e.g., for predicting the movement of an object).

The prediction system 126 can generate prediction data 132 associated with each of the respective one or more objects proximate to the vehicle 108. The prediction data 132 can be indicative of one or more predicted future locations of each respective object. The prediction data 132 can be indicative of a predicted path (e.g., predicted trajectory) of at least one object within the surrounding environment of the vehicle 108. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

In some implementations, the perception system 124 and the prediction system 126 can be combined into a perception and prediction system 129. For example, the perception and prediction system can be a first stage model configured to perceive one or more detected objects in the surrounding environment of the vehicle (e.g., using sensor data 116) and generate one or more predicted trajectories for the one or more detected objects. For example, the perception and prediction system 129 can generate data for the one or more detected objects, such as predicted trajectories, bounding boxes, probabilities, feature maps (e.g., one or more feature layers of an output from a machine-learned model), identifiers, and/or tracked or untracked states (e.g. higher order states) for the one or more detected objects, as discussed in greater detail herein.

The motion planning system 128 can determine a motion plan and generate motion plan data 134 for the vehicle 108 based at least in part on the prediction data 132 (and/or other data). The motion plan data 134 can include vehicle actions with respect to the objects proximate to the vehicle 108 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 108 can perform a certain action (e.g., pass an object) without increasing the potential risk to the vehicle 108 and/or violating any traffic laws (e.g., speed limits, lane boundaries, signage). The motion plan data 134 can include a planned trajectory, velocity, acceleration, and/or other actions of the vehicle 108.

The motion planning system 128 can provide the motion plan data 134 with data indicative of the vehicle actions, a planned trajectory, and/or other operating parameters to the vehicle control systems 138 to implement the motion plan data 134 for the vehicle 108. For instance, the vehicle 108 can include a mobility controller configured to translate the motion plan data 134 into instructions. By way of example, the mobility controller can translate a determined motion plan data 134 into instructions for controlling the vehicle 108 including adjusting the steering of the vehicle 108 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections). In some implementations, the communications system 136 can allow communication among one or more of the system on-board the vehicle 108. The communications system 136 can also be configured to enable the vehicle 108 to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 108 that is located in the front of the vehicle 108 (e.g., driver's seat, front passenger seat). Additionally, or alternatively, a display device can be viewable by a user of the vehicle 108 that is located in the rear of the vehicle 108 (e.g., a back passenger seat). For example, the autonomy computing system 120 can provide one or more outputs including a graphical display of the location of the vehicle 108 on a map of a geographical area within one kilometer of the vehicle 108 including the locations of objects around the vehicle 108. A passenger of the vehicle 108 can interact with the one or more human-machine interfaces 140 by touching a touch-screen display device associated with the one or more human-machine interfaces to indicate, for example, a stopping location for the vehicle 108.

In some implementations, the vehicle computing system 112 can perform one or more operations including activating, based at least in part on one or more signals or data (e.g., the sensor data 116, the map data 122, the state data 130, the prediction data 132, and/or the motion plan data 134) one or more vehicle systems associated with operation of the vehicle 108. For example, the vehicle computing system 112 can send one or more control signals to activate one or more vehicle systems that can be used to control and/or direct the travel path of the vehicle 108 through an environment.

By way of further example, the vehicle computing system 112 can activate one or more vehicle systems including: the communications system 136 that can send and/or receive signals and/or data with other vehicle systems, other vehicles, or remote computing devices (e.g., remote server devices); one or more lighting systems (e.g., one or more headlights, hazard lights, and/or vehicle compartment lights); one or more vehicle safety systems (e.g., one or more seatbelt and/or airbag systems); one or more notification systems that can generate one or more notifications for passengers of the vehicle 108 (e.g., auditory and/or visual messages about the state or predicted state of objects external to the vehicle 108); braking systems; propulsion systems that can be used to change the acceleration and/or velocity of the vehicle which can include one or more vehicle motor or engine systems (e.g., an engine and/or motor used by the vehicle 108 for locomotion); and/or steering systems that can change the path, course, and/or direction of travel of the vehicle 108.

Figure 2:
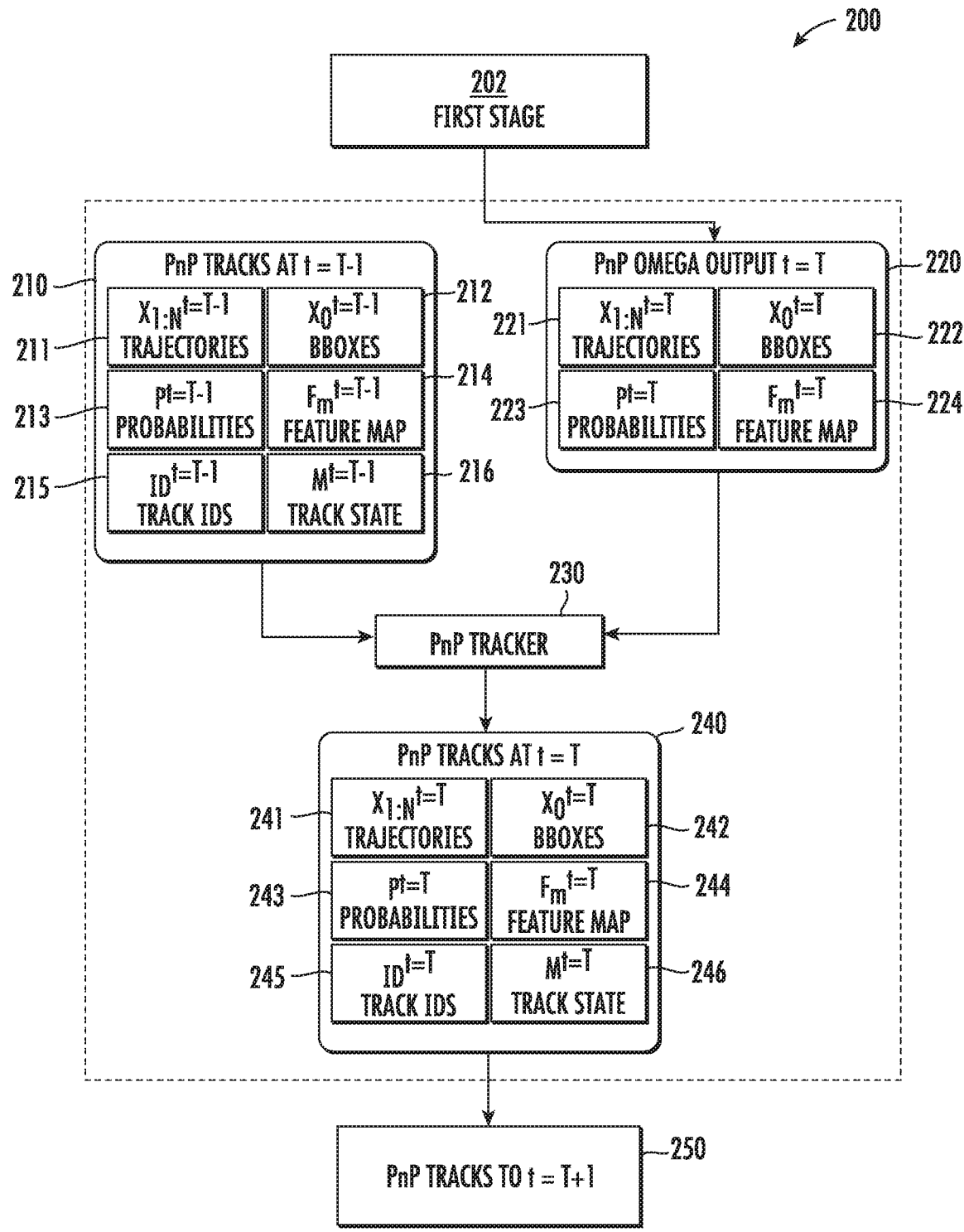
FIG. 2 depicts a diagram of an example model architecture according to example aspects of the present disclosure.

Referring now to FIG. 2, an example model architecture and an example technique for predicted trajectory association 200 is depicted. One or more operations and/or functions in FIG. 2 can be implemented and/or performed by one or more devices (e.g., one or more computing devices) and/or systems including, for example, the operations computing system 104, the vehicle 108, and/or the vehicle computing system 112, which are depicted in FIG. 1. Further, the one or more devices and/or systems in FIG. 2 can include one or more features of one or more devices and/or systems including, for example, the operations computing system 104, the vehicle 108, or the vehicle computing system 112, which are depicted in FIG. 1.

As shown, the example model architecture and example technique 200 can include a first stage model 202. For example, the first stage model 202 can be a perception and prediction model configured to detect objects in the surrounding environment of an autonomous vehicle and determine associated predicted trajectories.

For example, a first input 210 can include one or more predicted trajectories for a first time step. For example, the first time step can be one or more previous time steps (e.g., t=T−1, t=T−2, etc.). The first input 210 can include one or more trajectories 211, bounding boxes 212, probabilities 213, feature maps 214, identifiers 215, and/or states 216. For example, the trajectories 211 can include an associated trajectory for each detected object for one or more previous time steps. The bounding boxes 212 can be, for example, indicative of the location and/or size of a detected object in the environment. The one or more probabilities 213 can be, for example, descriptive of a classification of a detected object (e.g., bicycle, pedestrian, vehicle, etc.). The feature map 214 can be, for example, one or more feature layers extracted from an output of the first stage model 202. The identifiers 215 can be, for example, unique identifiers associated with each detected object. The states 216 can be, for example, state data associated with each detected object (position, velocity, etc.).

A second input 220 can be for a second time step. For example, the second time step can be a current time step (e.g., t=T). The second input 220 can be received from the first stage model 202. For example, the second input 220 can include one or more predicted trajectories 221, one or more bounding boxes 222, one or more probabilities 223, and/or one or more feature maps 224 associated with each detected object. The trajectories 221, bounding boxes 222, probabilities 223, and/or feature maps 224 at the second time step can be similar input data as the trajectories 211, bounding boxes 212, probabilities 213, and/or feature maps 214, but for the second time step. In some implementations, the trajectories 221 can be, for example, a predicted trajectory for one or more future time steps. In some implementations, the trajectories 221 can be, for example, a point (e.g., a position, such as a current position).

As shown, the first input data 210 and the second input data 220 can be input into a machine learned model 230. The machine learned model 230 can then generate a temporally-consistent trajectory 240 for at least one of the one or more objects or the one or more second objects based on the first input data 210 and the second input data 220. For example, the temporally-consistent trajectory can include trajectories 241, bounding boxes 242, probabilities 243, feature maps 244, identifiers 245, and/or states 246, similar to the first input data 210, but at the second time step (e.g., the current time step). The temporally-consistent trajectories 240 can include, for example, temporally-consistent positions, appearances, orientations, etc. which are available for use by the computing system in downstream computations.

As an example, the temporally-consistent trajectories 240 can include an association of a first trajectory 211 in the first input data 210 to a trajectory 221 in the second input data 220. For example, the machine learned model 230 can associate a trajectory 211 from the first input data 210 at the first time step to a trajectory 221 in the second input data 220. For example, the trajectory 211 can include a predicted trajectory for a particular detected object, which is associated with a particular identifier 215. The machine-learned model 230 can determine that a predicted trajectory 221 in the second input data 220 is highly associated with the first trajectory 211, and assign it to the same detected object, as identified by the particular identifier 215.

Further, the machine-learned model 230 can refine the predicted trajectory 221 in the second input data 220 to be more consistent with the associated predicted trajectory 211 in the first input data 210. For example, the predicted trajectory 221 in the second input data 220 can be smoothed (e.g., an orientation of a detected object can be aligned to be more consistent with the previous trajectory orientation for the detected object; a velocity and/or acceleration can be refined to reduce changes in velocity, acceleration, etc.) to improve the temporal consistency for detected objects.

The computing system can then determine a predicted trajectory 250 for one or more objects using the temporally-consistent trajectories 240. In some implementations, the predicted trajectory 250 for the second time step can be determined. In some implementations, the predicted trajectory 250 can include a predicted trajectory for one or more third time steps for one or more detected objects. The third time step can be, for example, a future time step (e.g., t=T+1, t=T+2, etc.).

Figure 3:
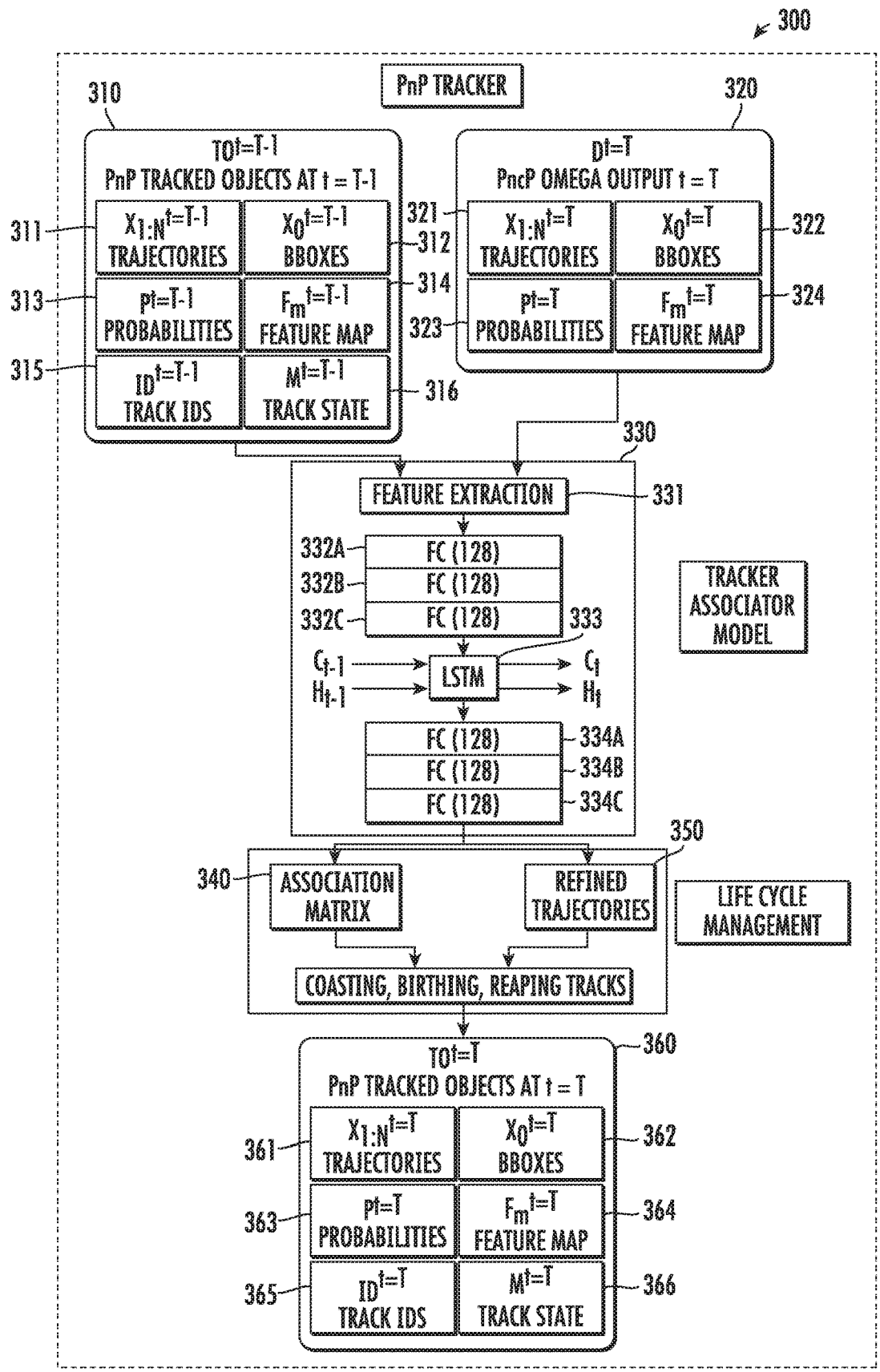
FIG. 3 depicts a diagram of an example model architecture according to example aspects of the present disclosure.

Referring now to FIG. 3, a diagram of an example model architecture and example technique 300 is depicted. One or more operations and/or functions in FIG. 3 can be implemented and/or performed by one or more devices (e.g., one or more computing devices) and/or systems including, for example, the operations computing system 104, the vehicle 108, and/or the vehicle computing system 112, which are depicted in FIG. 1. Further, the one or more devices and/or systems in FIG. 3 can include one or more features of one or more devices and/or systems including, for example, the operations computing system 104, the vehicle 108, and/or the vehicle computing system 112, which are depicted in FIG. 1.

As shown, a first input 310 can include one or more predicted trajectories for a first time step. For example, the first time step can be one or more previous time steps (e.g., t=T−1, t=T−2, etc.). The first input 310 can include one or more trajectories 311, bounding boxes 312, probabilities 313, feature maps 314, identifiers 315, and/or states 316. For example, the trajectories 311 can include an associated trajectory for each detected object for one or more previous time steps. The bounding boxes 312 can be, for example, descriptive of the location and/or size of a detected object in the environment. The one or more probabilities 313 can be, for example, descriptive of a classification of a detected object (e.g., bicycle, pedestrian, vehicle, etc.). The feature map 314 can be, for example, one or more feature layers extracted from an output of a first stage model. The identifiers 315 can be, for example, unique identifiers associated with each detected object. The states 316 can be, for example, state data associated with each detected object (position, velocity, etc.).

A second input 320 for a second time step. For example, the second time step can be a current time step (e.g., t=T). Similar to the first input, in some implementations, the second input 320 can be received from a first stage model. For example, the second input 320 can include one or more predicted trajectories 321, one or more bounding boxes 322, one or more probabilities 323, and/or one or more feature maps 324 associated with each detected object. The trajectories 321, bounding boxes 322, probabilities 323, and/or feature maps 324 at the second time step can be similar input data as the trajectories 311, bounding boxes 312, probabilities 313, and/or feature maps 314, but for the second time step. In some implementations, the trajectories 321 can be, for example, a predicted trajectory for one or more future time steps. In some implementations, the trajectories 321 can be, for example, a point (e.g., a position, such as a current position).

As shown, the first input data 310 and the second input data 320 can be input into a machine learned model 330. According to example aspects of the present disclosure, the machine-learned model 330 can be a tracker associator model configured to associate one or more predicted trajectories at a first time step (e.g., t=T-1) to one or more predicted trajectories at a second time step (e.g., t-T).

For example, as shown, the first input 310 and the second input 320 can be input into the machine-learned model 330, and more specifically, into a feature extraction layer 331. For example, the feature extraction layer 331 can extract one or more features from the inputs 310/320, such as one or more features from a feature map 314/324. The output from the feature extraction layer 331 can then be input into one or more convolutional layers of an encoder network. For example, in some implementations, the one or more convolutional layers can include one or more fully connected (FC) layers 332. In some implementations, the machine-learned model 330 can include, for example, 3 FC layers 332A-C of size 128, as depicted. In other implementations, more or fewer FC layers of different sizes can be included in the machine-learned model 330.

As shown, the machine-learned model 330 can further include an LSTM 333, and the output of the final FC layer 332 can be input into a LSTM 333. The LSTM 333 that can generate and update hidden states (e.g., $C_{t-1}$, $H_{t-1}$ to $C_t$, $H_t$) based on the inputs 310/320 into the machine-learned model 330. In some implementations, the machine-learned model 330 can include or otherwise consist of a gated recurrent unit (GRU) or other recurrent neural network (RNN).

For example, in some implementations, the machine-learned model 330 can be configured and/or trained to generate one or more hidden states that store one or more states of the detected object over time. Further, the association computing system can update the one or more hidden states when a predicted trajectory at the first time step (e.g., t=T-1) is determined to be associated with at least one of the predicted trajectories at the second time step (e.g., t=T). Further, the one or more hidden states can be associated with one or more features of a detected object including a velocity, acceleration, location, position, and/or physical dimensions of the detected object.

In some implementations, the computing system can discard the one or more hidden states when the predicted trajectory at the first time step is determined not to be associated with at least one of the predicted trajectories at the second time step. In some implementations, the computing system can use one LSTM per detected object. In some implementations, updating the one or more hidden states can be performed when an association score is above or below a threshold.

The output of the LSTM 333 can then be input into one or more convolutional layers. of a decoder network. For example, in some implementations, the one or more convolutional layers can include one or more fully connected (FC) layers 334. In some implementations, the machine-learned model 330 can include, for example, 3 FC layers 334A-C of size 128, as depicted. In other implementations, more or fewer FC layers of different sizes can be included in the machine-learned model 330. In some implementations, the one or more convolutional layers can include a sigmoid gate activation layer. In some implementations, the one or more convolutional layers can include a ReLU output activation layer.

As shown, in some implementations, the output of the machine-learned model 330 can include an association matrix 340 and/or one or more refined trajectories 350. For example, the machine-learned model can generate association data comprising data descriptive of an association of each respective trajectory for the one or more first objects (e.g., of a first input 310) to each respective trajectory for the one or more second objects of (e.g., of a second input 320).

In some implementations, the association data of an association matrix 340 can include an association score. The association score can indicate whether a trajectory at the first time step is associated with a trajectory at the second time step. In some implementations, the association score can be associated with a probability or likelihood that a trajectory at the first time step is associated with a trajectory at the second time step. For example, the association score can be positively correlated with the probability that a trajectory at the first time step (e.g., t=T-1) is associated with a trajectory at the second time step (e.g., t=T), such that a higher score is correlated with a high probability that a trajectory at the first time step is associated with a trajectory at the second time step. By way of further example, an association score can include a numeric score ranging from zero to one-hundred in which a higher score (e.g., a score closer to one-hundred) is associated with a higher probability that a trajectory at the first time step is associated with a trajectory at the second time step. The association score can have a linear or non-linear relationship with the probability that a trajectory at the first time step is associated with a trajectory at the second time step.

In some implementations, the machine-learned model 330 can generate the refined trajectories 350 for the at least one of the one or more first objects or the one or more second objects by refining the trajectory for at least one of the one or more second objects (e.g., of a second input 320). For example, a trajectory of a particular object in the one or more second objects at the second time step may be highly associated with a trajectory of an object in the one or more first objects at the first time step. The machine-learned model can refine the trajectory of the particular object in the one or more second objects at the second time step to more closely align with the associated trajectory of the one or more first objects at the first time step. As an example, the second trajectory for the particular object can be smoothed to reduce relatively large changes in velocity, direction, acceleration, etc. Further, the refined trajectory can include a temporally-consistent position, appearance, orientation, etc.

According to additional example aspects of the present disclosure, in some implementations, the machine-learned model 330 can be trained using a loss function comprising an association loss parameter and/or one or more trajectory loss parameters. For example, a total loss function $L_{Total}$ can include an association loss parameter and one or more trajectory loss parameters. For example, in some implementations, the total loss function $L_{Total}=w_a*L_{assoc}+w_{dim}*(L_{length}+L_{width})+w_{pos}*\Sigma_{t=0}^{T}L_{position_t}+w_{theta}*\Sigma_{t=0}^{T}L_{orientation_t}$, where $L_{length}$, $L_{width}$, $L_{position}$, $L_{orientation}$ are $L_{1;smooth}$ losses on the length, width, position, and orientation of the bounding box (bbox). Additionally, the association loss parameter can be defined as $L_{assoc}=-y_{label}*\log(p_{association})+(1-y_{label})*\log(1-p_{association})+\|y_{score}-\hat{y}_{score}\|L_{1;smooth}$. Further, training the machine-learned model 330 can include adjusting (e.g., weighting differently) one or more parameters of the machine-learned model 330 based at least in part on the contributions that each of the one or more parameters make towards minimizing the loss. Minimization of the loss can be positively correlated with more accurate association and trajectory refining.

In some implementations, additional loss functions can be used, such as a curvature loss parameter configured to penalize a second degree polynomial coefficient and/or a higher order loss parameter configured to penalize a velocity parameter and/or an acceleration parameter of a refined trajectory. For example, a refined trajectory can be represented by a polynomial comprising one or more coefficients. The loss function can penalize the machine-learned model 330 by comparing a second degree (or higher) coefficient to a ground truth coefficient and/or a coefficient received from a first stage model. Similarly, the loss function can penalize the machine-learned model 330 by comparing a predicted velocity or acceleration of a detected object and one or more points (e.g., waypoints) of an output refined trajectory to a ground truth acceleration and/or velocity and/or a predicted acceleration and/or velocity received from a first stage model.

According to additional aspects of the present disclosure, the computing system can further perform life cycle management for detected objects. For example, the computing system can perform coasting, birthing, and/or reaping of predicted trajectories associated with detected objects.

For example, when a first trajectory in the first input 310 is highly associated with a second trajectory in the second input 320, the computing system (e.g., the machine-learned model 330) can associate and update the two predicted trajectories (e.g., update the one or more hidden states associated with the predicted trajectories). If, however, one or more detected objects and/or one or more predicted trajectories are unmatched, the model architecture can determine whether to birth (e.g., create) a new detected object and/or a new predicted trajectory, coast (e.g., forward propagate) an existing detected object and associated predicted trajectory, or reap (e.g., remove) an existing detected object and any associated predicted trajectories from the list of actors in the surrounding environment.

In some implementations, one or more thresholds can be used to determine when to birth an object. For example, if a detection probability is greater than a threshold (e.g., $P_{det}>P_{thresh}$), but no previous associated detected object identifier (e.g., ID) and/or associated predicted trajectories exist for the detected object, the computing system can birth the object by, for example, creating a unique identifier associated with the detected object. Further, one or more associated hidden states can then be created for the detected object, which can then be updated at subsequent time steps.

In some implementations, a similar analysis can be used to determine whether to coast an object. For example, if a previously-detected object at a first time step is not detected at a second time step, the previously-detected object may be an occluded object (e.g., an object temporarily blocked by an obstruction). Stated differently, if a predicted trajectory for a previously-detected object at a first time step is not associated with a predicted trajectory at a second time step, the previously-detected object may be an occluded object. In some implementations, the predicted trajectory at the first time step can be forwarded propagated to the second time step. This can allow for the motion planning system to account for the previously-detected object at the second time step. Further, in some implementations, a misassociation count for the previously-detected object can be incremented (e.g., $N_{misassoc_t}=N_{misassoc_{t-1}}+1$), such as in a hidden state stored in the LSTM 333.

In some implementations, a similar analysis can be used to determine whether to reap an object. For example, if a previously-detected object and/or a previously predicted trajectory is not associated for more than a threshold number of time steps (e.g., $N_{misassoc}>N_{thresh}$), the computing system can reap the previously-detected object and/or any predicted trajectories associated with the previously-detected object. In this way, previously-detected objects which are no longer acting in the surrounding environment can be pared from the motion planning analysis, reducing computational complexity.

In some implementations, the machine-learned model 330 can be trained to coast, birth, and/or reap detected objects and/or associated predicted trajectories. For example, a training set comprising one or more ground truth life cycle management training examples can be used to train the machine-learned model 330.

As shown, the association matrix 340, the refined trajectory 350, and the life cycle management components (e.g., birthing, coasting, reaping) can be used by the computing system to generate a temporally-consistent trajectory 360 for one or more detected objects at the second time step. For example, the temporally-consistent trajectories 360 can include trajectories 361, bounding boxes 362, probabilities 363, feature maps 364, identifiers 365, and/or states 366, similar to the first input data 310, but at the second time step (e.g., the current time step). The temporally-consistent trajectories 360 can include, for example, temporally-consistent positions, appearances, orientations, etc. which are available for use by the computing system in downstream computations.

Figure 4:
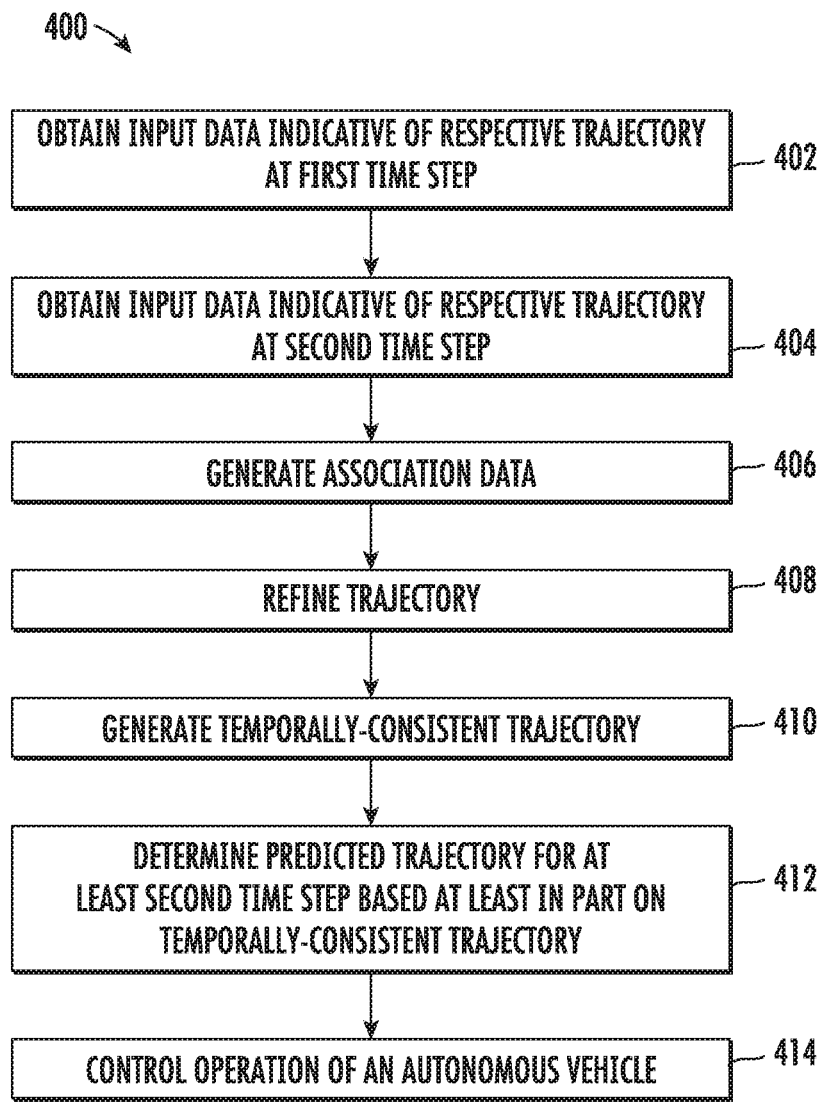
FIG. 4 depicts a flow diagram of an example method according to example aspects of the present disclosure.

FIG. 4 depicts a flow diagram of an example method 400 for generating temporally-consistent trajectories according to example aspects of the present disclosure. One or more portion(s) of the method 400 can be implemented by a computing system that includes one or more computing devices such as, for example, the computing systems described with reference to the other figures (e.g., the operations computing system 104, the vehicle 108, and/or the vehicle computing system 112, etc.). Each respective portion of the method 400 can be performed by any (or any combination) of one or more computing devices. FIG. 4 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 4 is described with reference to elements/terms described with respect to other systems and figures for example illustrated purposes and is not meant to be limiting. One or more portions of method 400 can be performed additionally, or alternatively, by other systems.

At 402, the method 400 can include obtaining input data indicative of a respective trajectory for each of one or more first objects at a first time step. For example, in some implementations, the input data indicative of the respective trajectory can include trajectories, bounding boxes, probabilities, feature maps, identifiers, states, and/or other input data, as described herein. In some implementations, the first time step can be a previous time step (e.g., $t=T-1$).

At 404, the method 400 can include obtaining input data indicative of a respective trajectory for each of one or more second objects for a second time step. The second time step can be subsequent to the first time step. For example, the second input data can include trajectories, bounding boxes, probabilities, feature maps, and/or other input data, as described herein. In some implementations, the second time step can be a current time step.

At 406, the method 400 can include generating association data. For example, a machine-learned model can generate association data descriptive of an association of each respective trajectory for the one or more first objects to each respective trajectory for the one or more second objects. In some implementations, the association data can include, for example, an association score in which a higher score is correlated with a higher probability that two trajectories are associated.

At 408, the method 400 can include refining a respective trajectory for at least one of the one or more first objects or the one or more second objects. For example, a first trajectory in the one or more first objects may be highly associated with a second trajectory in the one or more second objects. A machine-learned model can be trained to refine the second trajectory for the object by smoothing the second trajectory to reduce relatively large changes in velocity, direction, acceleration, etc. as compared to the first trajectory for the object. Further, the refined trajectory can include a temporally-consistent position, appearance, orientation, etc. for the object.

At 410, the method 400 can include generating a temporally-consistent trajectory for at least one of the one or more first objects or one or more second objects based at least in part on the input data indicative of the respective trajectory for the one or more first objects and the input data indicative of the respective trajectory for the one or more second objects. For example, the temporally-consistent trajectory can be generated using association data and refining trajectories, as described herein. Further, in some implementations, the temporally-consistent trajectory can be determined by performing life cycle management on trajectories in which trajectories are birthed, reaped, and/or coasted, as described herein.

For example, in some implementations, an object in the one or more first objects or the one or more second objects can be an occluded object. For example, an obstruction may block a previously-detected object such that the previously-detected object is no longer detectable. In some implementations, generating the temporally-consistent trajectory for the occluded object can include propagating a previous trajectory associated with the occluded object forward in time (e.g., coasting the predicted trajectory from a time step $t=T-1$ to $t=T$).

In some implementations, generating the temporally-consistent trajectory for the at least one object can include determining to birth the temporally-consistent trajectory for the at least one of the one or more objects. For example, if a predicted trajectory for an object in the one or more second objects at the second time step is not highly associated with any of the predicted trajectories for an object in the one or more first objects, a new predicted trajectory for the detected object can be created (e.g., birthed).

In some implementations, generating the temporally-consistent trajectory for the at least one object can include determining to reap the temporally-consistent trajectory for the at least one of the one or more objects. For example, if a previously-detected object and/or any predicted trajectories associated with the previously-detected object are not associated for more than a threshold number of time steps, the predicted trajectory and the associated detected object can be reaped to remove it from downstream computations.

At 412, the method 400 can include determining a predicted trajectory at the second time step based at least in part on the temporally-consistent trajectory. For example, the temporally-consistent trajectory can be propagated forward in time to a future time step (e.g., $t=T+1$).

At 414, the method 400 can include controlling operation of an autonomous vehicle based at least in part on the third predicted trajectory at the second time step. For example, a motion planning analysis can determine a motion plan for the autonomous vehicle based on the predicted trajectory for the future time step, and a vehicle controller can control operation of the autonomous vehicle according to the motion plan.

Figure 5:
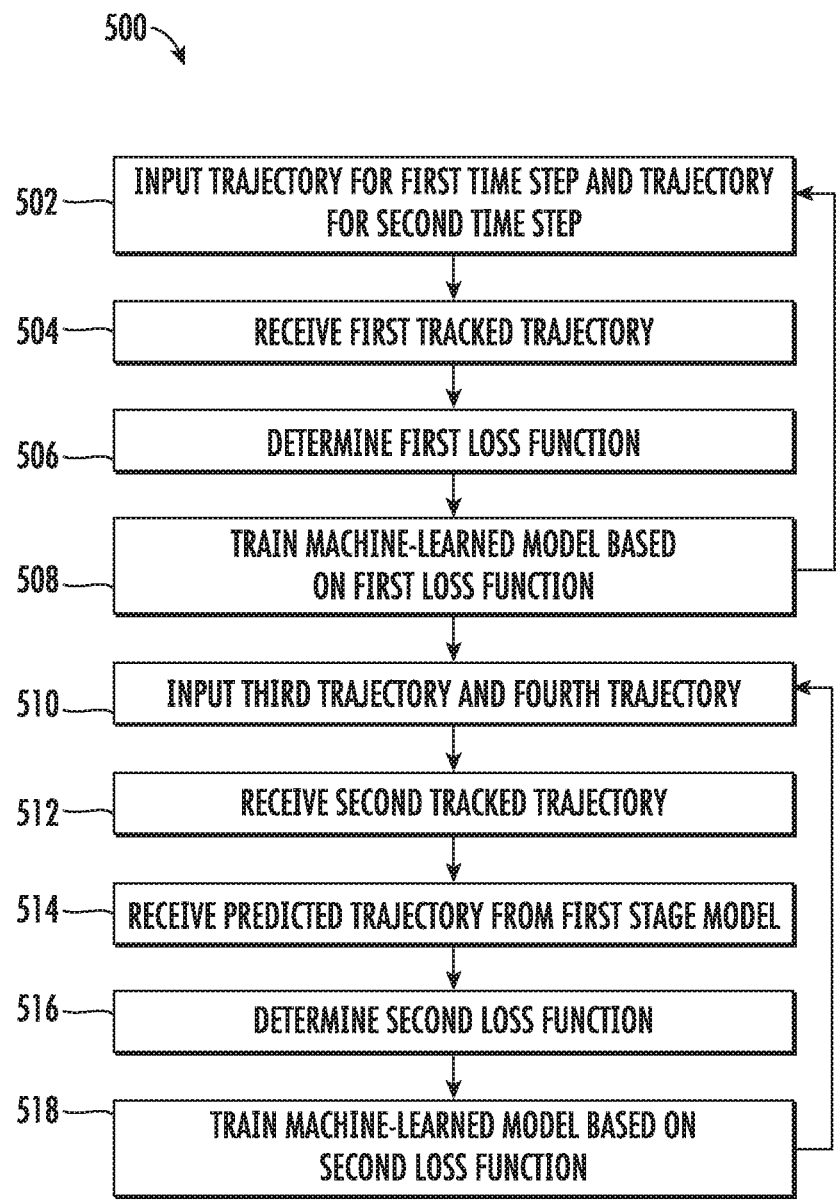
FIG. 5 depicts a flow diagram of an example method according to example aspects of the present disclosure.

FIG. 5 depicts a flow diagram of an example method 500 for training a machine-learned model according to example aspects of the present disclosure. One or more portion(s) of the method 500 can be implemented by a computing system that includes one or more computing devices such as, for example, the computing systems described with reference to the other figures (e.g., the operations computing system 104, the vehicle 108, and/or the vehicle computing system 112, etc.). Each respective portion of the method 500 can be performed by any (or any combination) of one or more computing devices. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 5 is described with reference to elements/terms described with respect to other systems and figures for example illustrated purposes and is not meant to be limiting. One or more portions of method 500 can be performed additionally, or alternatively, by other systems.

At 502, the method 500 can include inputting a respective trajectory for one or more first objects for a first time step and a respective trajectory for one or more second objects for a second time step into a machine-learned model. For example, a first input can be for a previous time step (e.g., $t=T-1$) and a second input can be at a second time step ($t=T$).

At 504, the method 500 can include receiving, as an output of the machine-learned model, data descriptive of a first tracked trajectory for one or more of the first or second objects. For example, the data descriptive of the first tracked trajectory can include at least one of an association of the respective trajectories for the one or more first objects to the respective trajectories for the one or more second objects and/or a refined trajectory for the one or more second objects.

At 506, the method 500 can include determining a first loss function based at least in part on a comparison of the data descriptive of the first tracked trajectory to a ground truth tracked trajectory. As an example, in some implementations, the first loss function can include an association loss parameter and/or one or more trajectory loss parameters, such as a length loss parameter, a width loss parameter, a position loss parameter, and/or an orientation loss parameter, as described herein. For example, an association loss parameter can describe a difference between an association matrix received as an output of the machine-learned parameter and a comparison to a ground truth association matrix.

At 508, the method 500 can include training the machine-learned model based at least in part on the first loss function. For example, in some implementations, backwards propagation of errors can be used to train the machine-learned model to reduce and/or minimize the difference between an output parameter of the machine-learned model and a corresponding ground truth parameter.

As shown, the steps 502 through 508 can be performed for one or more first training steps (e.g., multiple iterations). For example, upon training the machine-learned model based at least in part on a first loss function at step 508, the training method can return to step 502 for a different set of input trajectories.

At 510, the method 500 can include inputting a respective trajectory for one or more third objects for a third time step in a respective trajectory for one or more fourth objects for a fourth time step into the machine-learned model. For example, the third time step can be a time step prior to the fourth time step.

At 512, the method 500 can include receiving, as an output of the machine-learned model, data descriptive of a second tracked trajectory for one or more of the third or fourth objects. The data descriptive of the second tracked trajectory can include at least one of an association of the respective trajectories for the one or more third objects to the respective trajectories for the one or more fourth objects and a refined trajectory for the one or more fourth objects.

At 514, the method 500 can include receiving, as an output of a first stage model, a predicted trajectory for one or more of the third objects. As an example, the first stage model can be a model configured to perceive and predict trajectories for detected objects based at least in part on sensor data obtained from one or more sensors of an autonomous vehicle. The predicted trajectory determined by the first stage model can include various parameters, such as trajectories, bounding boxes, probabilities, feature maps, identifiers, and/or states, as described herein.

At 516, the method 500 can include determining a second loss function based at least in part on a comparison of the data descriptive of the second tracked trajectory to the predicted trajectory. As an example, in some implementations, the second loss function can include an association loss parameter and/or one or more trajectory loss parameters, such as a length loss parameter, a width loss parameter, a position loss parameter, and/or an orientation loss parameter, as described herein. For example, one or more trajectory loss parameters can describe a difference between the predicted trajectory for a detected object received from the first stage model and a refined trajectory for the detected object determined by the machine-learned model.

At 518, the method 500 can include training the machine-learned model based at least in part on the second loss function. For example, in some implementations, backwards propagation of errors can be used to train the machine-learned model to reduce and/or minimize the difference between an output parameter of the machine-learned model and a corresponding output from the first stage model.

As shown, the steps 510 through 518 can be performed for one or more second training steps (e.g., multiple iterations). For example, upon training the machine-learned model based at least in part on a second loss function at step 518, the training method can return to step 510 for a different set of input trajectories.

In some implementations, the first loss function and/or the second loss function can include a curvature loss parameter configured to penalize a second degree (or higher) polynomial coefficient for a refined trajectory. For example, a refined trajectory received as an output of the machine-learned model can be represented by a polynomial comprising one or more coefficients. The loss function can penalize the machine-learned model by comparing a second degree (or higher) coefficient to a ground truth coefficient and/or a coefficient received a first stage model.

In some implementations, the first loss function and/or the second loss function can include a higher order loss parameter configured to penalize a velocity parameter or an acceleration parameter of a refined trajectory. For example, the loss function can penalize the machine-learned model by comparing a predicted velocity or acceleration of a detected object received as an output of the machine-learned model and one or more points (e.g., waypoints) of an output refined trajectory to a ground truth acceleration and/or velocity and/or a predicted acceleration and/or velocity received from a first stage model.

In some implementations, the data descriptive of the first tracked trajectory for the one or more of the first or second objects or the data descriptive of the second tracked trajectory for one or more of the third or fourth objects can include a life cycle parameter comprising a birth, coast, or reap probability for the first or second tracked trajectory, respectively. Further, the machine-learned model can be trained based at least in part on a comparison of the life cycle parameter to a ground truth life cycle parameter or a predicted life cycle parameter received from the first stage model. As an example, the machine-learned model can use the life cycle parameter probabilities to determine whether to birth, reap, or coast a detected object's trajectory. The machine-learned model can then be trained based on a life cycle loss function which determines a difference in the probabilities and/or decision of the machine-learned model to birth, reap, or coast a detected object and a ground truth life cycle parameter or predicted life cycle parameter received from the first stage model. For example, backwards propagation of errors can be used to minimize the life cycle loss function.

Figure 6:
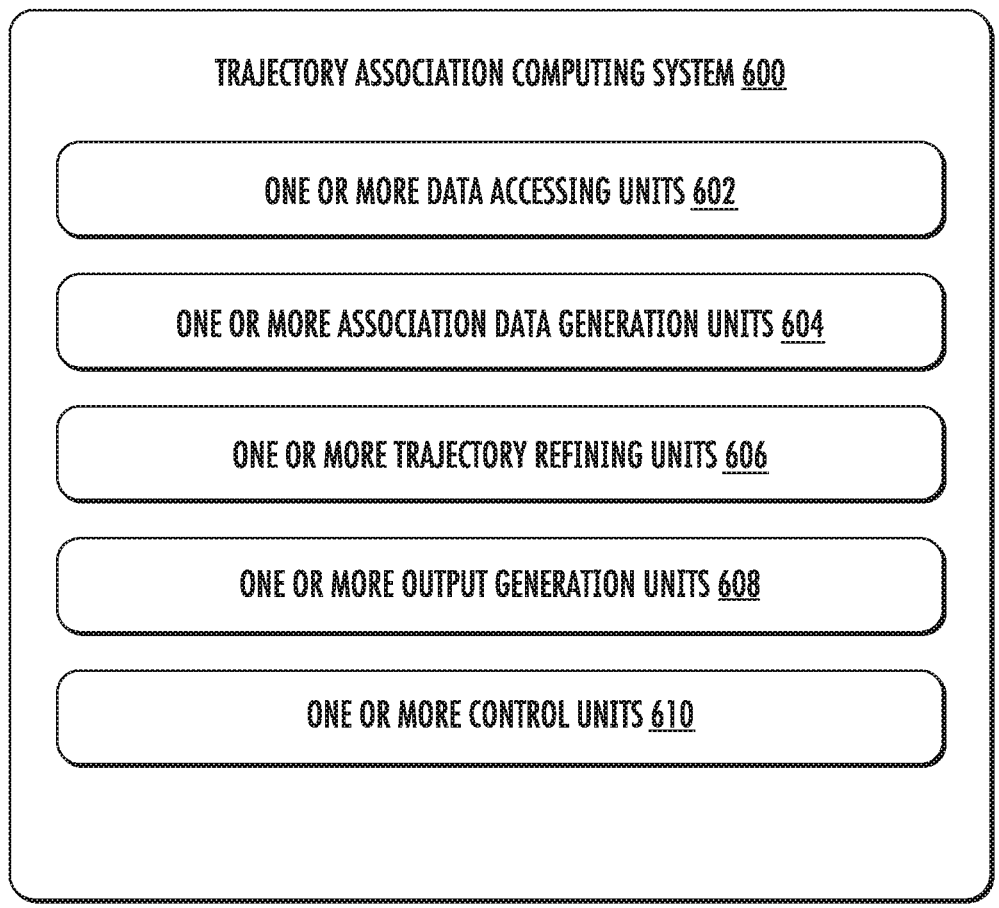
FIG. 6 depicts a diagram of an example system according to example aspects of the present disclosure.

Referring now to FIG. 6, an example trajectory association computing system 600 according to example aspects of the present disclosure is depicted. One or more operations and/or functions in FIG. 6 can be implemented and/or performed by one or more devices (e.g., one or more computing devices) or systems including, for example, the operations computing system 104, the vehicle 108, or the vehicle computing system 112, which are shown in FIG. 1.

Further, the one or more devices and/or systems in FIG. 6 can include one or more features of one or more devices and/or systems including, for example, the operations computing system 104, the vehicle 108, or the vehicle computing system 112, which are depicted in FIG. 1.

Various means can be configured to perform the methods and processes described herein. For example, an association computing system 600 can include one or more data accessing units 602, one or more association data generation units 604, one or more trajectory refining units 606, one or more output generation units 608, one or more control units 610, and/or other means for performing the operations and functions described herein. In some implementations, one or more of the units may be implemented separately. In some implementations, one or more units may be a part of, or included in, one or more other units. These means can include one or more processors, one or more microprocessors, one or more graphics processing units, one or more logic circuits, one or more dedicated circuits, one or more application-specific integrated circuits (ASICs), programmable array logic, one or more field-programmable gate arrays (FPGAs), one or more controllers, one or more microcontrollers, and/or other suitable hardware. The means can also, or alternately, include software control means implemented with a processor or logic circuitry for example. The means can include or otherwise be able to access memory including, for example, one or more non-transitory computer-readable storage media, such as random-access memory, read-only memory, electrically erasable programmable read-only memory, erasable programmable read-only memory, one or more flash/other memory devices, one or more data registrars, one or more databases, and/or other suitable hardware.

The means can be programmed (e.g., an FPGA custom programmed to operate an association computing system) or configured (e.g., an ASIC custom designed and configured to operate an association computing system) to perform one or more algorithms for performing the operations and functions described herein. For example, the means (e.g., the one or more data accessing units 602) can be configured to obtain input data. The input data can be indicative of a predicted trajectory for a detected object for a time step. The detected object can be within a surrounding environment of an autonomous vehicle. The input data can be indicative of first predicted trajectory for one or more first objects at a first time step and a second predicted trajectory for one or more second objects at a second time step.

The means (e.g., the one or more association data generation units 604) can be configured to generate association data. The association data can be based at least in part on the input data and/or one or more machine-learned models. The association data can indicate whether a first predicted trajectory is associated with a second predicted trajectory.

In some implementations, the one or more association data generation units 604 can be configured to update the one or more hidden states when a first predicted trajectory is determined to be associated with a second predicted trajectory.

In some implementations, the one or more association data generation units 604 can be configured to update the one or more hidden states when a first predicted trajectory is determined to not be associated with a second predicted trajectory.

In some implementations, the one or more association data generation units 604 can be configured to determine an association score a high score is positively correlated with an association of a first predicted trajectory to a second predicted trajectory.

In some implementations, the one or more association data generation units 604 can be configured to determine whether a first predicted trajectory is associated with a second predicted trajectory based at least in part on the association score.

The means (e.g., the one or more trajectory refining units 606) can be configured to determine a refined trajectory. For example, a second predicted trajectory for one of the one or more second objects at the second time step may be highly associated with a first predicted trajectory of one of the one or more first objects at the first time step. The means (e.g., the one or more trajectory refining units 606) can be configured to refine the second predicted trajectory to more closely align with the first predicted trajectory. As an example, the second predicted trajectory can be smoothed to reduce relatively large changes in velocity, direction, acceleration, etc. Further, the refined trajectory can include a temporally-consistent position, appearance, orientation, etc.

The means (e.g., the one or more output generation units 608) can be configured to output the association data and/or the refined trajectory data.

In some implementations, the one or more output generation units 608 can be configured to generate one or more temporally-consistent trajectories based at least in part on the association data and/or the refined trajectory data.

In some implementations, the one or more output generation units 608 can be configured to determine whether to birth, coast, or reap a predicted trajectory associated with a detected object.

The means (e.g., the one or more control units 610) can be configured to control an operation of the autonomous vehicle. The control of the autonomous vehicle can be based at least in part on the one or more temporally-consistent trajectories.

In some implementations, controlling, by the one or more control units 610, operation of an autonomous vehicle can include determining one or more motion plans based at least in part on the one or more temporally-consistent trajectories.

In some implementations, the one or more control units 610 can be configured to control an operation of the autonomous vehicle based at least in part on the one or more temporally-consistent trajectories.

Figure 7:
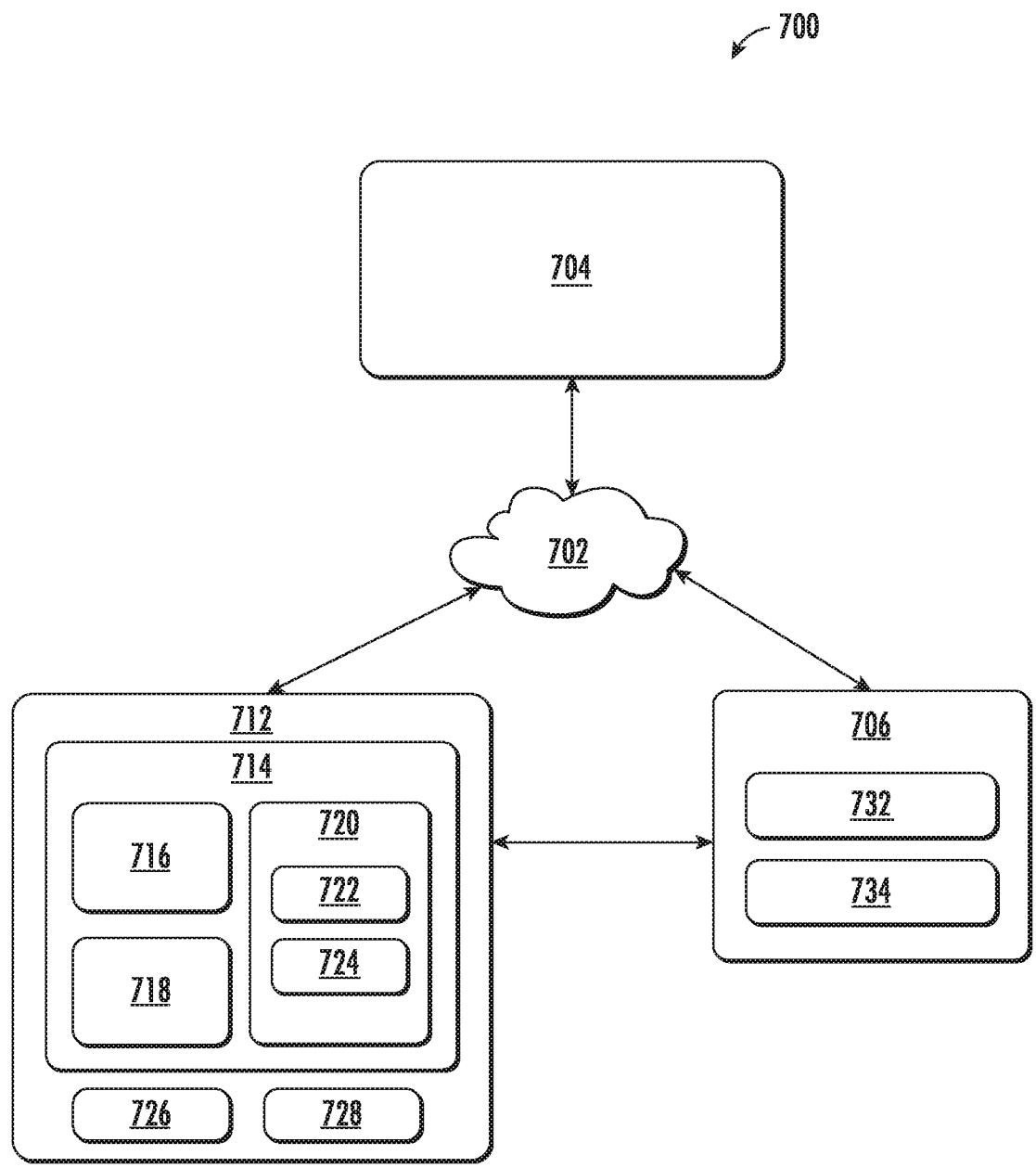
FIG. 7 depicts a diagram of an example system according to example aspects of the present disclosure.

FIG. 7 depicts a diagram of an example system according to example aspects of the present disclosure. A system 700 can include a network 702 which can include one or more features of the communications network 102 depicted in FIG. 1; an operations computing system 704 which can include one or more features of the operations computing system 104 depicted in FIG. 1; one or more remote computing devices 706 which can include one or more features of the one or more remote computing devices 106 depicted in FIG. 1; a vehicle computing system 712 which can include one or more features of the vehicle computing system 112 depicted in FIG. 1; one or more computing devices 714; a communication interface 716; one or more processors 718; one or more memory devices 720; memory system 722; memory system 724; one or more input devices 726; one or more output devices 728; one or more input devices 732; and one or more output devices 734.

The vehicle computing system 712 can include the one or more computing devices 714. The one or more computing devices 714 can include one or more processors 718 which can be included on-board a vehicle including the vehicle 108 and one or more memory devices 720 which can be included on-board a vehicle including the vehicle 108. The one or more processors 718 can include any processing device including a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs), and/or processing units performing other specialized calculations. The one or more processors 718 can include a single processor or a plurality of processors that are operatively and/or selectively connected. The one or more memory devices 720 can include one or more non-transitory computer-readable storage media, such as RAM, ROM, EEPROM, EPROM, flash memory devices, magnetic disks, and/or combinations thereof.

The one or more memory devices 720 can store data or information that can be accessed by the one or more processors 718. For instance, the one or more memory devices 720 which can be included on-board a vehicle including the vehicle 108, can include a memory system 722 that can store computer-readable instructions that can be executed by the one or more processors 718. The memory system 722 can include software written in any programming language that can be implemented in hardware (e.g., computing hardware). Further, the memory system 722 can include instructions that can be executed in logically and/or virtually separate threads on the one or more processors 718. The memory system 722 can include any set of instructions that when executed by the one or more processors 718 cause the one or more processors 718 to perform operations.

For example, the one or more memory devices 720 which can be included on-board a vehicle (e.g., the vehicle 108) can store instructions, including specialized instructions, that when executed by the one or more processors 718 on-board the vehicle cause the one or more processors 718 to perform operations such as any of the operations and functions of the one or more computing devices 714 or for which the one or more computing devices 714 are configured, including any of the operations performed by the vehicle computing system 112 and/or any other operations and/or functions for operation of a vehicle, as described in the present disclosure.

The one or more memory devices 720 can include a memory system 724 that can store data that can be retrieved, manipulated, created, and/or stored by the one or more computing devices 714. The data stored in memory system 724 can include, for instance, the input data and/or training data described herein. Furthermore, the data stored in the memory system 724 can include one or more machine-learned models that have been configured and/or trained to generate an output based at least in part on an input provided to the one or more machine-learned models. For example, the one or more machine-learned models stored in the memory system 724 can include one or more convolutional neural networks, one or more residual convolutional neural networks, one or more recurrent neural networks (e.g., LSTM network), and/or one or more recursive neural networks. Further, the one or more machine-learned models stored in the memory system 724 can include the one or more machine-learned models described herein.

The data that is stored in the memory system 724 can also include data associated with one or more predicted trajectories for one or more detected objects at one or more time steps, data associated with one or more refined trajectories; data associated with one or more temporally-consistent trajectories; data associated with life cycle management; sensor data (e.g., the one or more sensors 114 of the vehicle 108 that is described in the method 100 that is depicted in FIG. 1); data associated with one or more states of a device associated with the operations and/or functions of the vehicle computing system 712, the operations computing system 704, and/or the one or more remote computing devices 706; data generated by any of the computing systems (e.g., the vehicle computing system 112) and/or computing devices involved in the determination of whether a first predicted trajectory is associated with one or more second predicted trajectories as described herein; data associated with user input; data associated with one or more actions and/or control command signals; data associated with users; the input data described herein; and/or other data or information. The data in the memory system 724 can be stored in one or more databases. The one or more databases can be split up so that the one or more databases are located in multiple locales on-board a vehicle which can include the vehicle 108. In some implementations, the one or more computing devices 714 can obtain data from one or more memory devices that are remote from a vehicle, including, for example the vehicle 108.

The system 700 can include the network 702 (e.g., a communications network) which can be used to send and/or receive signals (e.g., electronic signals) or data (e.g., data from a computing device) including signals or data exchanged between computing devices including the operations computing system 704, the one or more remote computing devices 706, and/or the vehicle computing system 712. The network 702 can include any combination of various wired (e.g., twisted pair cable) and/or wireless communication mechanisms (e.g., cellular, wireless, satellite, microwave, and radio frequency) and/or any desired network topology (or topologies). For example, the communications network 702 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from a vehicle including the vehicle 108.

The one or more computing devices 714 can also include the communication interface 716 used to communicate with one or more other systems which can be included on-board a vehicle including the vehicle 108 (e.g., over the network 702). The communication interface 716 can include any suitable components for interfacing with one or more networks, including for example, transmitters, receivers, ports, controllers, antennas, other hardware and/or software.

The vehicle computing system 712 can also include one or more input devices 726 and/or one or more output devices 728. The one or more input devices 726 and/or the one or more output devices 728 can be included and/or otherwise associated with a human-machine interface system. The one or more input devices 726 can include, for example, hardware for receiving information from a user, such as a touch screen, touch pad, mouse, a keyboard, data entry keys, and/or a microphone that can be configured to be suitable for voice recognition. The one or more output devices 728 can include one or more display devices (e.g., LCD, OLED, plasma, and/or CRT); a projector device that can project images onto a surface; and/or one or more audio output devices (e.g., loudspeakers). The one or more output devices 728 can be used to facilitate communication with a user. For example, a human operator (e.g., associated with a service provider) can communicate with a current user of a vehicle including the vehicle 108 via at least one of the display devices and/or the audio output devices.

The operations computing system 704 can include one or more computing devices configured to perform one or more operations associated with operating one or more services. The one or more services can include one or more transportation services, courier services, and/or delivery services. Furthermore, the operations computing system 704 can include one or more processors and one or more memory devices that can be used to store data including the input data, the sensor data, the training data, and/or one or more machine-learned models that are stored in the memory system 724.

The one or more remote computing devices 706 can include various types of computing devices. For example, the one or more remote computing devices 706 can include a telephone, a smart phone, a tablet, a personal digital assistant (PDA), a laptop computer, a computerized watch (e.g., a smart watch), computerized eyewear, computerized headwear, other types of wearable computing devices, a gaming system, a media player, an e-book reader, and/or other types of computing devices. The one or more remote computing devices 706 can be associated with a user. The one or more remote computing devices 706 described herein can also be representative of a user device that can be included in the human machine interface system of a vehicle including the vehicle 108.

The one or more remote computing devices 706 can include one or more input devices 732 and/or one or more output devices 734. The one or more input devices 732 can include, for example, hardware for receiving information from a user, such as a touch screen, touch pad, mouse, data entry keys, speakers, and/or a microphone suitable for voice recognition. The one or more output devices 734 can include hardware for providing content for display. For example, the one or more output devices 734 can include a display device (e.g., display screen, CRT, LCD), which can include hardware for a user interface.

Furthermore, the one or more remote computing devices 706 can include one or more processors and one or more memory devices which can be used to store data including the input data, the sensor data, the training data, and/or the one or more machine-learned models that are stored in the memory system 724.

The technology discussed herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Databases and applications can be implemented on a single system or distributed across multiple systems. Distributed components can operate sequentially or in parallel.

Furthermore, computing tasks discussed herein as being performed at computing devices remote from the vehicle (e.g., the operations computing system and its associated computing devices) can instead be performed at the vehicle (e.g., via the vehicle computing system). Such configurations can be implemented without deviating from the scope of the present disclosure.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for generating a trajectory for an object, comprising:
    obtaining, by a computing system comprising one or more computing devices, input data indicative of a respective trajectory for each of one or more first objects at a first time step;
    obtaining, by the computing system, input data indicative of a respective trajectory for each of one or more second objects at a second time step, the second time step subsequent to the first time step and the one or more second objects comprising at least one of the one or more first objects;
    generating, by the computing system using a machine-learned model, a temporally-consistent trajectory for at least one of the one or more first objects or the one or more second objects based at least in part on the input data indicative of the respective trajectory for the one or more first objects and the input data indicative of the respective trajectory for the one or more second objects; and
    determining, by the computing system, a third predicted trajectory for the at least one of the one or more first objects or the one or more second objects for at least the second time step based at least in part on the temporally-consistent trajectory for the at least one of the one or more first objects or the one or more second objects;
    wherein generating, by the computing system using the machine-learned model, the temporally-consistent trajectory for the at least one of the one or more first objects or the one or more second objects comprises:
    generating, by the machine-learned model, association data comprising data descriptive of an association of each respective trajectory of a first object of the one or more first objects to each respective trajectory of a second object of the one or more second objects; and
    generating, by the machine-learned model, the temporally-consistent trajectory for at least one of the one or more second objects based at least in part on the association data.

2. The computer-implemented method of claim 1, wherein the at least one of the one or more first objects or the one or more second objects comprises an occluded object; and
    wherein generating, by the computing system using the machine-learned model, the temporally-consistent trajectory for the at least one of the one or more first objects or the one or more second objects comprises:
    propagating a previous trajectory associated with the occluded object forward in time.

3. The computer-implemented method of claim 1, wherein generating, by the computing system using the machine-learned model, the temporally-consistent trajectory for the at least one of the one or more first objects or the one or more second objects comprises:
    generating, by the machine-learned model, association data by the machine-learned model, the association data comprising data descriptive of an association of each respective trajectory for the one or more first objects to each respective trajectory for the one or more second objects; and generating, by the machine-learned model, the temporally-consistent trajectory for the at least one of the one or more second objects based at least in part on the association data.

4. The computer-implemented method of claim 1, wherein generating, by the computing system using the machine-learned model, the temporally-consistent trajectory for the at least one of the one or more first objects or the one or more second objects comprises refining, by the machine-learned model, the respective trajectory for the at least one of the one or more first objects or the one or more second objects.

5. The computer-implemented method of claim 1, wherein the at least one object comprises an object of the one or more second objects that is not highly associated with an object in the one or more first objects; and wherein generating, by the computing system using the machine-learned model, the temporally-consistent trajectory for the at least one of the one or more first objects or the one or more second objects comprises:

determining, by the computing system, to birth the temporally-consistent trajectory for the at least one of the one or more second objects.

6. The computer-implemented method of claim 1, wherein the at least one object comprises an object of the one or more first objects that is not highly associated with an object in the one or more second objects; and wherein generating, by the computing system using the machine-learned model, the temporally-consistent trajectory for the at least one of the one or more first objects or the one or more second objects comprises:

determining, by the computing system, to reap the temporally-consistent trajectory for the at least one of the one or more second objects.

7. The computer-implemented method of claim 1, wherein the input data indicative of the first predicted trajectory or the input data indicative of the second predicted trajectory comprises data output from a first stage model configured to perceive the one or more first objects or the one or more second objects and predict a trajectory for the one or more first objects or the one or more second objects based at least in part on sensor data obtained by one or more sensors of an autonomous vehicle.

8. The computer-implemented method of claim 1, wherein the input data indicative of the first predicted trajectory or the input data indicative of the second predicted trajectory comprises one or more trajectories, bounding boxes, probabilities, feature maps, identifiers, and/or tracked or untracked higher order states for the one or more first objects or one or more second objects.

9. The computer-implemented method of claim 1, wherein the first time step comprises a past time step and wherein the second time step comprises a current time step.

10. The computer-implemented method of claim 1, wherein the machine-learned model has been trained using a loss function comprising an association loss parameter and one or more trajectory loss parameters.

11. The computer-implemented method of claim 1, wherein the machine-learned model has been trained for one or more training steps using one or more ground-truth temporally-consistent trajectories and trained for one or more training steps using one or more outputs from a first stage model configured to determine a predicted trajectory for one or more objects using sensor data.

12. The computer-implemented method of claim 1, wherein the machine-learned model comprises a LSTM, GRU or RNN model.

13. An autonomous vehicle, comprising:

one or more processors;

a memory comprising one or more tangible non-transitory computer-readable media, the media storing computer-readable instructions that when executed by the one or more processors cause the one or more processors to perform operations comprising:

obtaining input data indicative of a respective trajectory for each of one or more first objects for a first time step from a first stage model configured to generate predicted trajectories for detected objects using sensor data from sensors of the autonomous vehicle obtained at the first time step;

obtaining input data indicative of a respective trajectory for each of one or more second objects for a second time step from the first stage model using sensor data from the sensors of the autonomous vehicle obtained at the second time step, the second time step subsequent to the first time step;

generating a temporally-consistent trajectory for at least one of the one or more second objects based at least in part on the input data indicative of the respective trajectory for the one or more first objects and the input data indicative of the respective trajectory for the one or more second objects using a machine-learned model; and determining a third predicted trajectory for at least one of the one or more first objects or the one or more second objects for at least the second time step based at least in part on the temporally-consistent trajectory for the at least one of the one or more first objects or the one or more second objects;

wherein generating, by the computing system using the machine-learned model, the temporally-consistent trajectory for the at least one of the one or more first objects or the one or more second objects comprises:

generating, by the machine-learned model, association data comprising data descriptive of an association of each respective trajectory of a first object of the one or more first objects to each respective trajectory of a second object of the one or more second objects; and generating, by the machine-learned model, the temporally-consistent trajectory for the at least one of the one or more second objects based at least in part on the association data.

14. The autonomous vehicle of claim 13, wherein the operations further comprise:

controlling the autonomous vehicle based at least in part on the third predicted trajectory for the at least one of the one or more first objects or one or more second objects.

15. The autonomous vehicle of claim 13, further comprising:

one or more sensors configured to obtain sensor data;

wherein the first stage model is configured to perceive the one or more first objects or the one or more second objects and predict a trajectory for the one or more first objects or the one or more second objects based at least in part on the sensor data obtained by the one or more sensors; and wherein the input data indicative of the first predicted trajectory or the input data indicative of the second predicted trajectory comprises data output from the first stage model.

* * * * *